(12) United States Patent
Tripathi et al.

(10) Patent No.: US 11,604,981 B2
(45) Date of Patent: Mar. 14, 2023

(54) TRAINING DIGITAL CONTENT CLASSIFICATION MODELS UTILIZING BATCHWISE WEIGHTED LOSS FUNCTIONS AND SCALED PADDING BASED ON SOURCE DENSITY

(71) Applicant: Adobe Inc., San Jose, CA (US)

(72) Inventors: Ankit Tripathi, Bengaluru (IN); Adarsh Ghagta, Bangalore (IN); Rahul Sharma, Bangalore (IN); Tridib Roy Chowdhury, Bangalore (IN)

(73) Assignee: Adobe Inc., San Jose, CA (US)

( * ) Notice: Subject to any disclaimer, the term of this patent is extended or adjusted under 35 U.S.C. 154(b) by 925 days.

(21) Appl. No.: 16/458,432

(22) Filed: Jul. 1, 2019

(65) Prior Publication Data

US 2021/0004670 A1 Jan. 7, 2021

(51) Int. Cl.
*G06N 3/08* (2006.01)
*G06N 20/00* (2019.01)
*G06K 9/62* (2022.01)
*G06V 30/148* (2022.01)
*G06V 30/414* (2022.01)

(52) U.S. Cl.
CPC ............... *G06N 3/08* (2013.01); *G06K 9/628* (2013.01); *G06K 9/6256* (2013.01); *G06N 20/00* (2019.01); *G06V 30/153* (2022.01); *G06V 30/414* (2022.01)

(58) Field of Classification Search
CPC ........ G06N 3/08; G06N 20/00; G06K 9/6256; G06K 9/628; G06V 30/153; G06V 30/414
USPC .......................................................... 706/25
See application file for complete search history.

(56) References Cited

U.S. PATENT DOCUMENTS 11,074,412 B1 * 7/2021 Leeman-Munk ........ G06N 3/08
2020/0202103 A1 * 6/2020 Tang ......................... G06N 3/08

FOREIGN PATENT DOCUMENTS

CN 109743732 A * 5/2019

OTHER PUBLICATIONS

Cheng, Y., et al. "Document classification based on convolutional neural network and hierarchical attention network." Neural Network World 29.2 (2019): 83-98. (Year: 2019).*

(Continued)

*Primary Examiner* — Stephen S Hong
*Assistant Examiner* — Broderick C Anderson
(74) *Attorney, Agent, or Firm* — Keller Preece PLLC

(57) ABSTRACT

Methods, systems, and non-transitory computer readable storage media are disclosed for training a machine-learning model utilizing batchwise weighted loss functions and scaled padding based on source density. For example, the disclosed systems can determine a density of words or phrases in digital content from a digital content source that indicate an affinity towards one or more content classes. In some embodiments, the disclosed systems can use the determined source density to split digital content from the source into segments and pad the segments with padding characters based on the source density. The disclosed systems can also generate document embeddings using the padded segments and then train the machine-learning model using the document embeddings. Furthermore, the disclosed system can use batchwise weighted cross entropy loss for applying different class weightings on a per-batch basis during training of the machine-learning model.

20 Claims, 10 Drawing Sheets

(56) References Cited

OTHER PUBLICATIONS

Kim, Y., 2014. Convolutional neural networks for sentence classification. arXiv preprint arXiv:1408.5882. (Year: 2014).*
Joulin, A., Grave, E., Bojanowski, P. and Mikolov, T., 2016. Bag of tricks for efficient text classification. arXiv preprint arXiv:1607.01759.
Kim, Y., 2014. Convolutional neural networks for sentence classification. arXiv preprint arXiv:1408.5882.

* cited by examiner

TRAINING DIGITAL CONTENT CLASSIFICATION MODELS UTILIZING BATCHWISE WEIGHTED LOSS FUNCTIONS AND SCALED PADDING BASED ON SOURCE DENSITY

BACKGROUND

Recent years have seen a significant increase in storage, management, and distribution of digital content (e.g., electronic documents, digital videos, and/or digital images) across client devices utilizing computer networks. For example, conventional digital content management systems can capture or generate digital content and then distribute the digital content to individual client devices. To illustrate, conventional digital content management systems can classify electronic documents to determine document categories and then curate and distribute digital content to targeted client devices.

In addition, many cloud-based systems can store and manage digital content for client devices. For example, cloud-based systems can store thousands or millions of digital content items that users can access via various client devices. Some conventional digital content management systems classify electronic documents and determine document categories to assist in managing these large digital content repositories.

Although these conventional digital content management systems classify electronic documents to determine document categories, they also have a number of significant shortcomings in relation to accuracy and efficiency of operation. For example, conventional digital content management systems often undermine accuracy by rigidly training machine learning models from unitary sources and/or overfitting a model to sparse training data points. Conventional digital content management systems are also often inefficient in that they utilize excessive computing resources in training over a large number of epochs and transmit incorrect or irrelevant content to client devices. In addition, conventional digital content management systems often apply losses in training in a manner that leads to numerical instability and undermines convergence to accurate results.

Thus, there are several technological shortcomings with regard to conventional digital content management systems.

SUMMARY

One or more embodiments provide benefits and/or solve one or more of the foregoing or other problems in the art with systems, methods, and non-transitory computer readable storage media that train digital content classification models utilizing scaled padding based on source density. In particular, in training a machine learning model the disclosed systems can emphasize training samples that include distinctive terms by dynamically adjusting this scaled padding for different text sources. For example, in some embodiments, the disclosed systems increase the amount of padding for distinctive sources in generating training embeddings. As a result of this padding, training embeddings that reflect more distinctive/class relevant terms have a greater influence on the machine learning model. In this manner, the disclosed systems can more efficiently and accurately train flexible machine-learning models to classify content across various digital content sources.

For example, in one or more embodiments, the disclosed systems selectively pad word/phrase embeddings having a strong affinity towards a particular class/category or combination of classes. In particular, the disclosed systems can determine digital content source densities based on the ratio of distinctive words used in documents from different digital content sources relative to content neutral words from a neutral word corpus. The disclosed systems can then apply padding to word embeddings based on the density of distinctive words for each digital content source. The disclosed systems thus reduce the impact of embedding of common words (i.e., classification neutral words) when deriving embeddings of documents from the words in the documents while emphasizing word embeddings from digital content sources that contain distinctive words or phrases.

Furthermore, in one or more embodiments, the disclosed systems utilize batchwise weighted loss functions in training the machine-learning model. Specifically, the disclosed systems can set different weights for different classes for loss determination in a batch of training samples based on the proportion of samples of each class. More specifically, in one or more embodiments the disclosed systems calculate a weight for a given class based on the number of positive samples relative to the batch size for the given class. The disclosed systems can thus use dynamic assignment of weights in determining the losses to prevent numerical instability while fairly and accurately representing positive and negative samples. Using this approach, the disclosed systems can further improve accuracy and efficiency in training digital content classification models across various classes.

Additional features and advantages of one or more embodiments of the present disclosure will be set forth in the following description.

BRIEF DESCRIPTION OF THE DRAWINGS

Various embodiments will be described and explained with additional specificity and detail through the use of the accompanying drawings in which.

DETAILED DESCRIPTION

Figure 1:
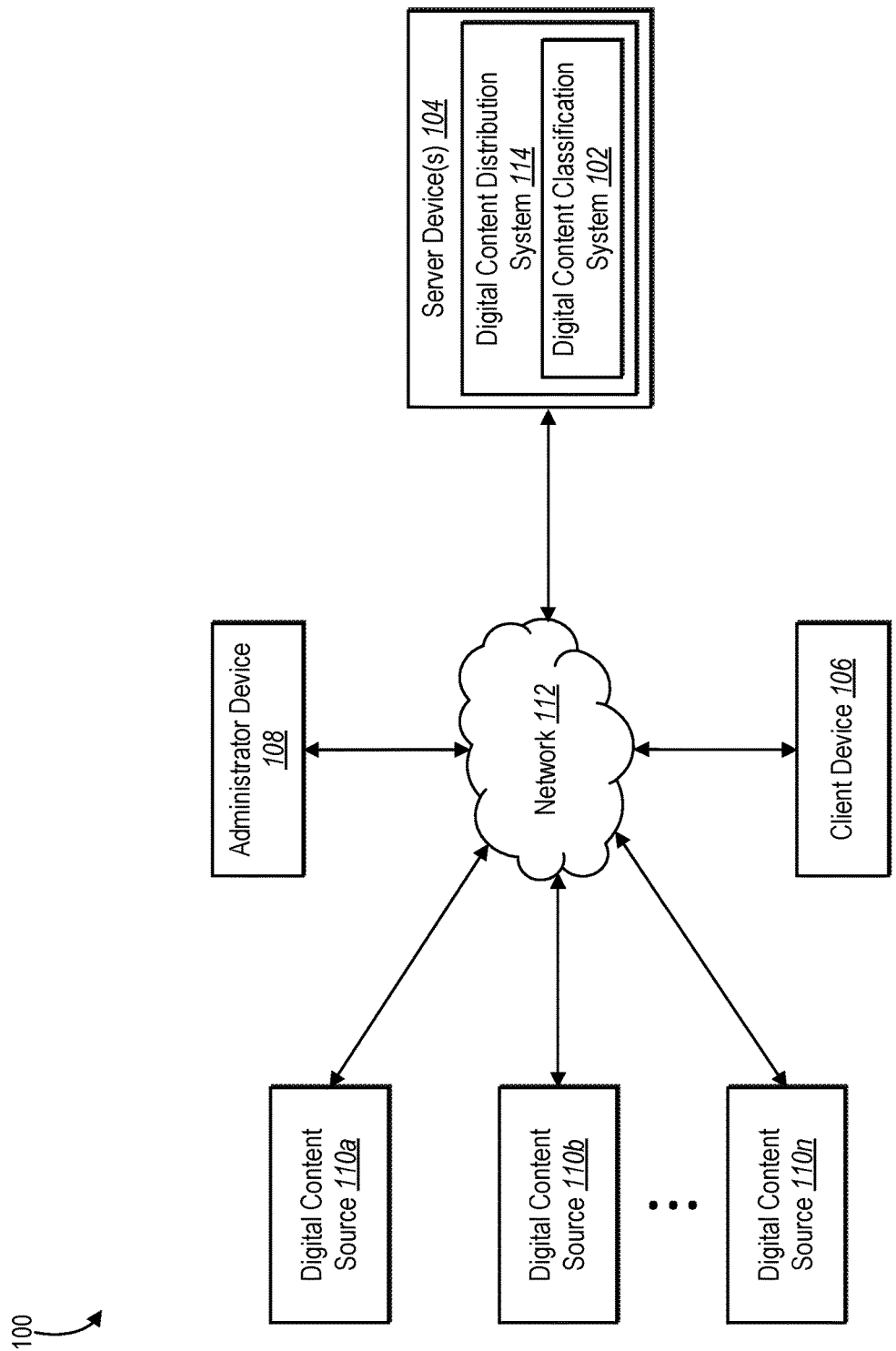
FIG. 1 illustrates an example environment in which a digital content classification system can operate in accordance with one or more implementations.

One or more embodiments of the present disclosure include a digital content classification system (also "classification system") that trains a machine-learning model to classify digital content from a variety of digital content sources utilizing scaled padding based on source density. For example, the classification system can determine a density of class-relevant words from a digital content source by comparing the digital content from the source to a neutral word corpus. In one or more embodiments, the classification system then creates word embeddings with padded word segments based on the source density (e.g., generates word segments with a plurality of appended zeroes so that word segments from higher density sources have greater padding). The classification system can also generate document embeddings for the digital content by concatenating the padded word embeddings. In one or more embodiments, the classification system trains a machine-learning model using the document embeddings such that document embeddings from digital content sources with higher density of class-relevant words have a greater impact than document embeddings with a lower source density. This approach can improve accuracy (while reducing time and computational resources used) in training machine-learning models to classify documents from a variety of digital content sources.

Additionally, in one or more embodiments, the classification system utilizes a batchwise weighted loss function to train the machine-learning model. Specifically, the classification system can determine weights to apply to individual classification categories when determining loss from an output of the machine-learning model for each batch of training samples. For example, the classification system can determine weights for different categories in a batch based on the proportion of positive samples in each category. The classification system can then use a batchwise weighted cross-entropy loss to modify parameters of the machine-learning model using customized weights for output categories within each separate batch of training samples. By utilizing batchwise weighted loss functions, the disclosed systems can further improve accuracy and efficiency of training digital content classification models.

The classification system can determine source densities for different digital content sources. For example, in some embodiments, the classification system identifies documents from a digital content source (e.g., by accessing existing text documents or converting other media documents to text). The classification system can compare the text documents from the digital content source to a corpus of classification neutral words to determine distinguishing words for the digital content source. In one or more embodiments, the classification system determines the source density by dividing the number of distinguishing words identified for the digital content source by the total number of unique words in the digital content source. As mentioned above, the classification system can determine different source densities for different digital content sources utilized to train a machine-learning model.

The classification system can utilize different source densities to emphasize different embeddings of text documents from different digital content sources in training a machine-learning model. In particular, in one or more embodiments, the classification system uses a source density for a digital content source to create padded segments from a text document from the digital content source. In particular, the classification system can split the text document into segments including word sequences having a length determined based on the source density. For example, the length of the word sequences can be inversely proportional to the source density, such that a higher source density results in shorter word sequences, and vice versa. In one or more embodiments, the classification system then pads the segments with a set of padding characters (e.g., 0-embeddings) that extend the segments to a consistent length. In this manner, the classification system can create padded segments having a consistent length for documents across a plurality of different digital content sources without inserting bias toward any classes. In one or more embodiments, longer padded portions of the padded segments indicate higher source densities, while shorter padded portions of the padded segments indicate lower source densities.

In one or more embodiments, the classification system creates document embeddings representing text documents from digital content sources. Specifically, the classification system can generate word embeddings representing padded segments corresponding to a text document from a digital content source. For instance, the classification system can utilize an encoder model to generate word embeddings that are vector representation of each padded segment in the text document. In one or more embodiments, the classification system then determines document embedding by combining (e.g., averaging) the word embeddings corresponding to the text document. Accordingly, in one or more embodiments the classification system generates a document embedding that is a vector representation of a plurality of words in the text document and that reflects the source density of the digital content source.

In one or more embodiments, the classification trains a machine-learning model using document embeddings as inputs to the machine-learning model. For example, the classification system can provide a document embedding representing a text document from a digital content source to the machine-learning model. The machine-learning model can generate a predicted class for the text document based on the document embedding. The classification system determines a loss for the predicted class by comparing the predicted class to a ground-truth class for the text document and then uses the loss to modify parameters of the machine-learning model. By utilizing document embeddings generated from padded segments that reflect different source densities, the machine-learning model emphasizes document embeddings generated from distinctive digital content sources.

In one or more embodiments, the classification system determines a weighted cross-entropy loss for each batch of training samples. In particular, the classification system can determine weights to apply in loss determination based on the proportion of positive samples of the training samples in a batch of training samples. For instance, the classification system can determine, for a given batch of training samples, a weight to use for each class based on the proportion of positive samples of the class relative to the total number of samples for the class within the given batch. The classification system can thus determine losses using batch-specific weights corresponding to the classes of the training samples.

Conventional digital content management systems have a number of shortcomings in relation to accuracy, efficiency, and flexibility of operation. For example, some conventional digital content management systems rigidly train machine learning models utilizing training samples of the same type (e.g., from a single source). Accordingly, conventional systems utilize the same analysis and approach across training samples. This inflexible approach undermines accuracy in applying the machine-learning model inasmuch as digital content in application rarely comes from a single digital content source. In other words, applying machine-learning models trained on a single digital content source in real-world circumstances involving multiple digital content sources undermines the accuracy and effectiveness of the model.

In an attempt to improve accuracy, some conventional systems over-sample or under-sample certain documents more frequently than other data-points. This approach generally requires training for more epochs and often results in overfitting on training data points. Accordingly, this approach also results in inconsistent and inaccurate classification predictions.

Furthermore, conventional digital content management systems are often inefficient. As just mentioned, conventional systems require a large number of epochs in training a machine-learning model, which requires excessive time and computer resources to execute. In addition, because conventional systems struggle to accurately classify content, these systems select and transmit incorrect or irrelevant content to client devices. Accordingly, in training and in application, conventional systems often result in unnecessary and inefficient use of computing resources.

Conventional systems also introduce inaccuracies and inefficiencies when training models based on imbalanced data. Indeed, it is common during data collection to generate training data sets that have imbalanced categories or classification samples. When training machine learning models on imbalanced data, models often develop bias to predict the model in favor of the majority class. Moreover, in multi-label classification (when the number of categories becomes large), conventional systems often prefer to predict false negatives because individual categories have more negative examples than positive examples to train on.

Some conventional systems compensate for imbalanced classification samples by over-sampling from under-represented classes. This approach, however, leads to over-fitting to the over-sampled classes. Moreover, this approach does not address the multi-label classification problem discussed above, inasmuch as each class generally has less than 50% of positive training samples in circumstances with a large number of categories. Some systems seek to address problems introduced by imbalanced training samples by utilizing cross entropy loss, where weights are set as hyperparameters before training starts. This approach, however, leads to numerical instability (as not all batches of the training have data in the same proportion). In other words, this approach results in amplifying penalties of specific samples in a batch that later get canceled out in subsequent batches, sometimes resulting in significant movement of the loss across batches and convergence to minima different from the general trends. This approach undermines convergence to an accurate result and increases the time and computing resources utilized in training.

The disclosed digital content classification system provides a number of advantages over conventional systems. For example, the classification system improves accuracy and flexibility relative to conventional systems. In particular, the classification system improves accuracy and flexibility by training a machine-learning model based on a variety of different digital content sources and source densities (e.g., based on quality of content) corresponding to the content sources. For instance, by generating embeddings for text documents with scaled padding based on the source density of digital content sources, the classification system can emphasize embeddings that reflect more distinctive, classification relevant training data from different sources. This results in machine learning models that converge to accurately classify documents from a variety of different sources (e.g., text, video, or audio).

Furthermore, the digital content classification system can also improve efficiency relative to conventional systems. Indeed, by emphasizing class-relevant embeddings based on source density, the digital content classification system can converge more quickly in training a digital content classification model. As a result, the digital content classification system can train accurate machine learning models with less time and computational overhead.

The digital content classification system can also improve accuracy, efficiency, and flexibility in utilizing batchwise weighted loss functions. Specifically, the digital content classification system can flexibility modify weights across different classes in different batches in determining loss and training a machine learning model. By utilizing batchwise weighted loss during training, the classification system can cause the machine-learning model to converge to an accurate, fully trained model more quickly due to the reduction/elimination of numerical instability. Additionally, the classification system can improve usage of computer resources by reducing irrelevant or inaccurate content transmitted to client devices.

The present disclosure utilizes a variety of terms to describe features and advantages of the digital content classification system. For example, as used herein, machine-learning models are a computer representation that can be tuned (e.g., trained) based on inputs to approximate unknown functions. In particular, machine-learning models can include a model that utilizes algorithms to learn from, and make predictions on, known data by analyzing the known data to learn to generate outputs that reflect patterns and attributes of the known data. For instance, a machine-learning model can include but is not limited to, decision trees, support vector machines, linear regression, logistic regression, Bayesian networks, random forest learning, dimensionality reduction algorithms, boosting algorithms, artificial neural networks (e.g., convolutional neural networks, recurrent neural networks, or dense networks), deep learning, etc. Thus, a machine-learning model makes high-level abstractions in data by generating data-driven predictions or decisions from the known input data.

A class (sometimes referred to as category) is a classification (or type) of content. In particular, a class is a content classification that indicates the subject (and/or focus) of an electronic content item and/or a portion of an electronic content item. For instance, a class can include a content type that indicates actions, objects, scenes, persons, and/or themes described in an electronic document and/or a segment of the electronic document. For example, a class can include descriptions such as, but not limited to, "soft skills," "business ethics," "medicine," "production and manufacturing," "scientific research and engineering," "sales," "sports," "food," "mountains," and/or "running" to classify the subject of an electronic document and/or a portion of the electronic document.

A digital content source (or source) is a type, origin, category or kind of digital content. For example, a digital content source can include a system or device that stores and/or provides digital content. Similarly, digital content sources can an include blogs, social media posts, digital videos, digital audio, books, or websites. The classification system can identify or generate text documents from a variety of different sources.

A text document (or electronic document) is a digital representation of text. In particular, a text document includes to an electronic file that includes text. For instance, a document can include an article, research paper, book (e.g., an e-book), website, blog, social media post, PDF file, and/or other text based files. For example, a document includes a text processing file (e.g., file extensions .doc, .docx, .txt, and/or .wpd), a digital image file that includes text (e.g., file extensions .pdf, .jpg, .tif, and/or .ai), text files for transcriptions of videos, or other digital files (e.g., web files such as .html or .js, spreadsheet files such as .xls, and/or video files that contain text). The classification system can utilize and or generate text documents from a variety of different digital content. In one or more embodiments, digital content includes documents, digital images, digital videos, and/or other representations of digital media.

In addition, a segment is a representation of a portion of a text document. In particular, a segment can include sequence of words, phrases, or n-grams of a document. For example, a segment can include a portion of a document that results from a division of the content of a document. For instance, a segment can include a sequence of divided parts of a document based on a determined number of words and/or characters (e.g., a segment can include a sequence of fifty words from the electronic document).

A padded segment is a segment that includes a word portion and a padded portion (e.g., in which the word portion includes one or more words or representations of words and the padded portion includes a set of padding characters). Padding characters are characters appended to a segment of words. In one or more embodiments, padding characters include zeroes (e.g., 0-embeddings).

A source density is a metric indicating a proportion of words or phrases in a digital content source. Specifically, a source density can include a proportion of words in digital content of a digital content source that differ from a word corpus. Additionally, a word corpus (or neutral word corpus or classification neutral word corpus) is a collection of words. In particular, a word corpus includes a collection of commonly used words in a language (e.g., a top number of words used in a language). For example, a classification neutral word corpus can include a set of words that are common across a plurality of categories or that are the most common words in a language. The word corpus can be extracted, for example, from a plurality of documents from any number of digital content sources.

A word embedding is a representation of a n-gram as a vector. In particular, a word embedding can include a representation of word (e.g., contiguous characters having a meaning) as a vector. For instance, a word embedding can include a vector representation of a word, a plurality of words, or a phrase from a text document. A document embedding is a representation of a document as a vector (e.g., combining word embeddings corresponding to the document). For example, a document embedding can be determined by averaging word embeddings present in the document.

Additional detail will now be provided regarding the digital content classification system in relation to illustrative figures portraying exemplary implementations. To illustrate, FIG. 1 includes an embodiment of an environment 100 in which a digital content classification system 102 operates. In particular, the environment 100 includes server device(s) 104, a client device 106, an administrator device 108 and digital content sources 110a-110n in communication via a network 112 (examples of which will be described in more detail below with respect to FIG. 9).

As shown, the environment 100 may include the server device(s) 104. The server device(s) 104 may generate, store, analyze, receive, and transmit a variety of types of data, including digital content, documents, and classifications. For example, the server device(s) 104 can identify digital content from the digital content sources 110a-110n, analyze the digital content, and send a selected digital content item to a client device, such as the client device 106. The server device(s) 104 can also transmit electronic messages between one or more users of the environment 100. In one example embodiment, the server device(s) 104 is a data server. The server device(s) 104 can also comprise a communication server or a web-hosting server. Additional details regarding the server device(s) 104 will be discussed below with respect to FIG. 9.

Moreover, as shown, the server device(s) 104 include a digital content distribution system 114, which includes the digital content classification system 102. In particular, the digital content distribution system 114 can store, obtain, manage, and/or distribute digital content in relation to the administrator device 108 and/or the client device 106 in connection with a variety of services. For example, the digital content distribution system 114 can manage a social networking system (e.g., a system that selects and provides digital content across client devices and/or servers). Similarly, the digital content distribution system 114 can manage a repository of digital content (e.g., stores, manage, and identify digital content for client devices). Thus, the digital content distribution system 114 can select (e.g., curate) and provide content to a device (e.g., as part of a social learning system). Additionally, the digital content distribution system 114 can distribute content in response to a search request for digital content related to a particular content class (e.g., via a search engine within a web browser or other application on the client device 106).

In one or more embodiments, the digital content classification system 102 can train a classification model (e.g., a machine-learning classifier) to analyze digital content from a plurality of digital content sources 110a-110n and classify the digital content into a plurality of categories. Specifically, the classification system 102 determines a source density based on the words/phrases used in the digital content for the source. The classification system 102 can then use documents from the source to train the classification model by generating segments with scaled padding based on the source density and using the segments as inputs to the classification model.

Furthermore, the classification system 102 can train the classification model using batchwise weighted loss detection. In particular, the classification system 102 can determine batch-specific weights for applying to the categories based on the proportion of positive samples in each batch of a training dataset. For example, the classification system 102 can train the classification model in batches from a training dataset. The classification system 102 can then use the losses from the batches to update parameters of the classification model to more accurately predict classes of subsequent documents input to the classification model.

In addition to training a classification model, the classification system 102 can also apply a classification model to determine classes corresponding to digital content. For example, the classification system 102 can determine classes for digital content and then utilize the classes to provide digital content to the client device 106. To illustrate, the classification system 102 can access a user profile corresponding to the user, determine interests or characteristics of the user, identify a correspondence between the interests or characteristics of the user and a class, and then select digital content to provide based on the class.

As shown, the environment 100 also includes the digital content sources 110a-110n. The digital content sources 110a-110n can include repositories of digital content including video, audio, images, and/or text. As briefly mentioned previously, a digital content source from the digital content sources 110a-110n can include one or more computing devices that store digital content and/or a particular type or category of digital content. To illustrate, a digital content source can include blogs, news, video, crowd sourced content, research papers, social media posts, etc. The classification system 102 can obtain digital content from any number of digital content sources for training and/or implementing one or more classification models. In addition, one or more of the digital content sources 110a-110n can be implemented, managed, and/or stored at the administrator device 108, the client device 106, and/or the server device(s) 104.

In addition, as shown in FIG. 1, the environment 100 includes the client device 106. The client device 106 can include, but is not limited to, a mobile device (e.g., smartphone or tablet), a laptop, and/or a desktop, including those computing devices explained below with reference to FIG. 9. Furthermore, although not shown in FIG. 1, the client device 106 can be operated by a user to perform a variety of functions. In particular, the client device 106 can perform functions such as, but not limited to, creating, storing, uploading, downloading, viewing, and/or modifying a variety of digital content (e.g., text documents, digital videos, digital audio, and/or digital images). For example, the client device 106 can communicate with the server device(s) 104 via the network 112 to provide and/or receive digital content to and/or from the server device(s) 104. Additionally, the client device 106 can request text documents (or digital content corresponding to the text documents), interact with digital content, and/or conduct search queries for digital content which include category classifications on the server device(s) 104 and/or the network 112. Although FIG. 1 illustrates the environment 100 with a single client device 106, the environment 100 can include any number of client devices.

As shown in FIG. 1, the environment 100 also includes the administrator device 108. The administrator device 108 can include, but is not limited to, a mobile device (e.g., smartphone or tablet), a laptop, and/or a desktop, including those computing devices explained below with reference to FIG. 9. Although FIG. 1 illustrates the environment 100 with a single administrator device 108, the environment 100 and/or the administrator device 108 can include any number of devices.

The administrator device 108 can be operated by an administrator to perform a variety of functions. For example, the administrator device 108 can define campaign parameters for distributing digital content to the client device 106 as part of a digital content campaign. For instance, the administrator device 108 can provide digital content, targeting parameters, a budget, and/or a time schedule for distributing digital content (e.g., via a social networking system, applications, or websites). The administrator device 108 can submit a request to the classification system 102 to determine whether to provide digital content to the client device 106. Additionally, the administrator device 108 can create, store, upload, modify, and/or distribute digital content.

Although FIG. 1 illustrates the server device(s) 104, the client device 106, the administrator device 108, and the digital content sources 110a-110n communicating via the network 112, the various components of the environment 100 can communicate and/or interact via other methods (e.g., the server device(s) 104 and the client device 106 can communicate directly). Furthermore, although FIG. 1 illustrates the digital content classification system 102 being implemented by a particular component and/or device within the environment 100, the digital content classification system 102 can be implemented, in whole or in part, by other computing devices and/or components in the environment 100 (e.g., the client device 106 and/or the administrator device 108).

The digital content classification system 102 can train a classification model using digital content from a plurality of digital content sources. In particular, the classification system 102 can use source densities associated with digital content sources to generate embeddings for documents from each document source. The classification system 102 can then use the embeddings as inputs to a classification model and updates the parameters of the classification model according to losses from the outputs of the classification model.

Figure 2:
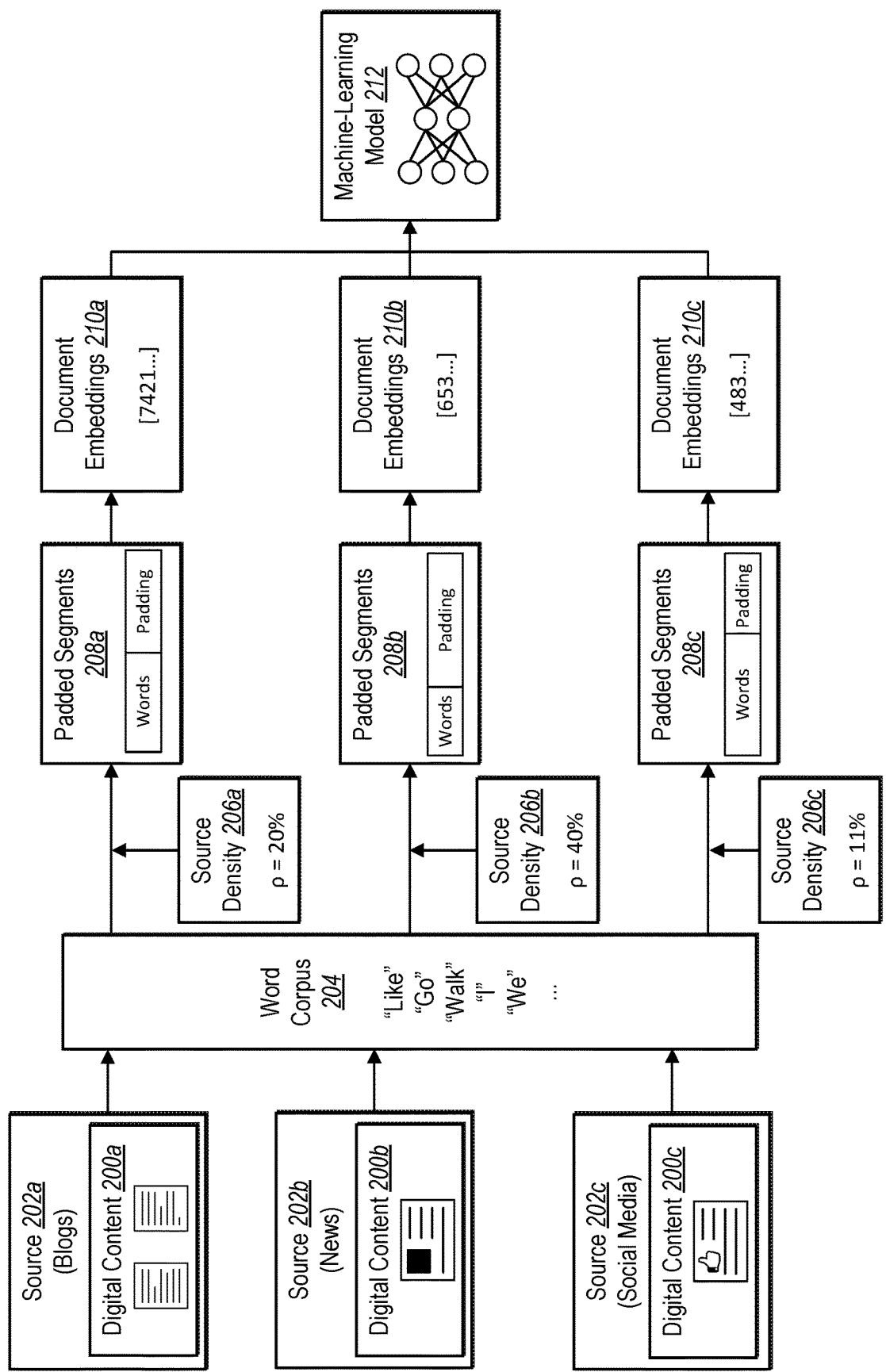
FIG. 2 illustrates a diagram of a process for training a machine-learning model to classify digital content in accordance with one or more implementations.

FIG. 2 illustrates an overview of training a machine-learning classification model using documents from a plurality of different sources in accordance with one or more embodiments. For example, as shown in FIG. 2, the classification system 102 obtains digital content 200a-200c from a plurality of sources 202a-202c. In one or more embodiments, the digital content includes video, audio, or text documents. The classification system 102 identifies a vocabulary of a set of words (or phrases) for the sources 202a-202c based on the digital content 200a-200c. For example, the classification system 102 can identify a first set of words based on digital content 200a corresponding to a first digital content source 202a, a second set of words based on digital content 200b corresponding to a second digital content source 202b, and a third set of words based on digital content 200c corresponding to a third digital content source 202c. While FIG. 2 illustrates three different sources 202a-202c, the classification system 102 can obtain digital content from any number of sources.

After determining a set of words or phrases (i.e., a vocabulary) for each source 202a-202c based on the digital content 200a-200c, the classification system 102 determines source densities 206a-206c for each source. Specifically, the classification system 102 compares the word sets from the sources 202a-202c to a word corpus 204 that includes neutral words (i.e., words that do not have a bias or polarity towards a specific class or set of classes). Comparing the set of words from the sources 202a-202c to the word corpus 204 allows the classification system 102 to determine the source densities 206a-206c, which reflect a number or ratio of distinctive (e.g., class-relevant words) from each source 202a-202c. For instance, the classification system 102 can determine how many words from a source are found in the word corpus 204 and then determine the density as the proportion of remaining words relative to the total number of words in the source. The words from the sources 202a-202c that have an affinity towards one or more categories allow the classification system 102 to determine the sources 202a-202c that have an affinity towards one or more categories, as described in more detail with respect to FIG. 3 below.

After determining the source densities 206a-206c associated with the sources 202a-202c, the classification system 102 uses the source densities 206a-206c to generate padded segments 208a-208c. In particular, the classification system 102 generates a plurality of initial segments that include sequences of words from the documents in each of the sources 202a-202c by dividing vocabularies of the documents into the sequences of words (e.g., vectors). For instance, the classification system 102 generates the initial segments for a document from a source (e.g., the first digital content source 202a) where the initial segments have a length (e.g., sequence length) determined based on the corresponding source density 206a.

As shown, the classification system 102 adds padding to the initial segments from the documents. Specifically, the classification system 102 pads the segments with a set of padding characters (e.g., zeroes) to lengthen the segments so that all segments from any document and any source has the same padded length. Accordingly, the padded segments 208a-208c have a padded length greater than the longest non-padded segment corresponding to the sources 202a-202c. Furthermore, as illustrated in FIG. 2, generating the padded segments 208a-208c causes segments from higher density sources to have more padding than segments from lower density segments.

Figure 4A:
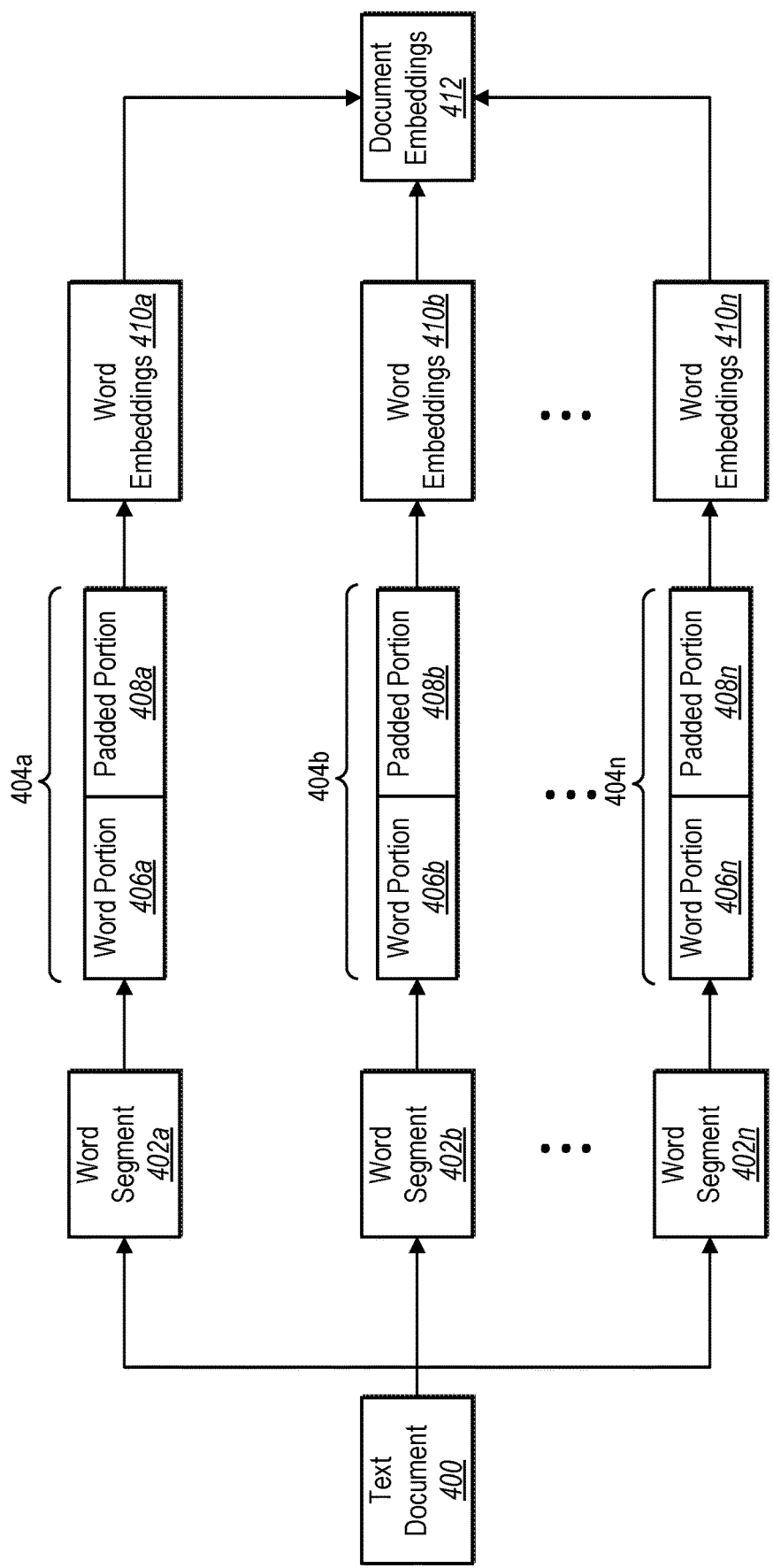
FIG. 4A illustrates a diagram of a process for generating document embeddings for text documents in accordance with one or more implementations.
Figure 4B:
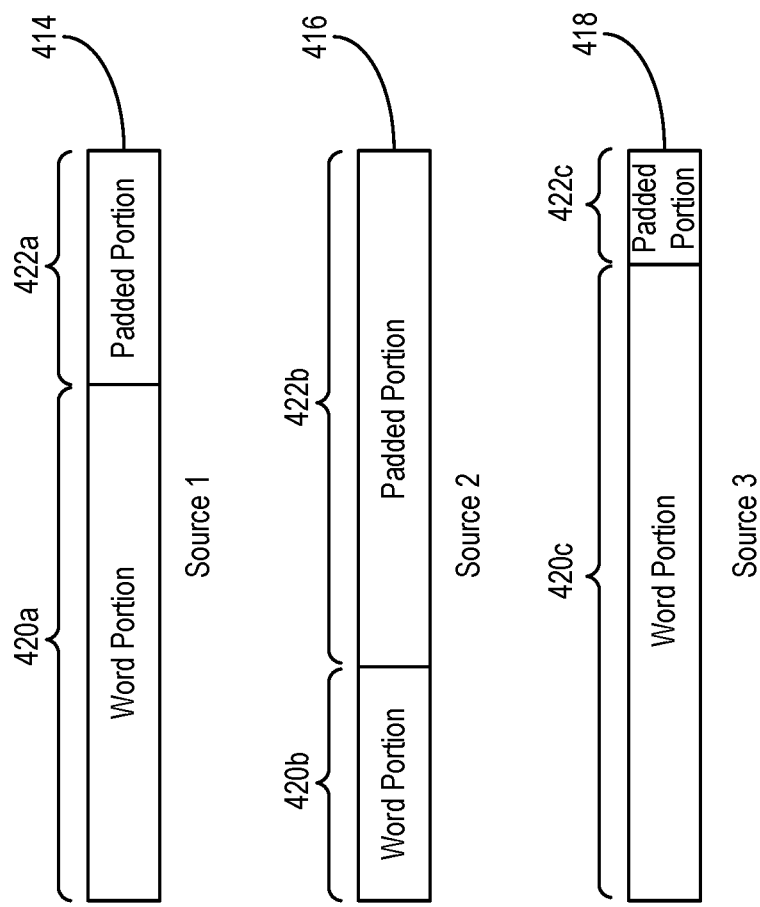
FIG. 4B illustrates a diagram of a plurality of word embeddings associated with different digital content sources in accordance with one or more implementations.

The classification system 102 then creates document embeddings 210a-210c representing documents from the sources 202a-202c based on the corresponding padded segments 208a-208c. In one or more embodiments, the classification system 102 utilizes word embeddings (vector representations of n-grams from the vocabularies of the sources 202a-202c) corresponding to the padded segments 208a-208c to create the document embeddings 210a-210c. In particular, the classification system 102 can utilize an encoder (e.g., one-hot-encoding or semantic encoding such as a Word2Vec model) to generate word embeddings and then combine the word embeddings associated with a given document to generate the document embeddings 210a-210c. To illustrate, the classification system 102 creates a document embedding for a text document by combining the word embeddings from segments corresponding to the text document. In an example, the classification system 102 combines the word embeddings by averaging the word embeddings, resulting in an averaged vector representation of the n-grams in the text document. FIGS. 4A-4B and the corresponding description provide additional detail in connection with generating word embeddings and document embeddings.

As further illustrated in FIG. 2, the classification system 102 also trains a machine-learning model 212 using the document embeddings 210a-210c. In particular, the classification system 102 analyzes the document embeddings 210a-210c utilizing the machine-learning model 212 to generate predicted categories for the digital content. Moreover, the classification system 102 can compare the predicted categories with ground-truth categories and update parameters of the machine-learning model 212. Additional detail on training a machine-learning model is provided below with regard to FIG. 5 and the accompanying description.

Figure 3:
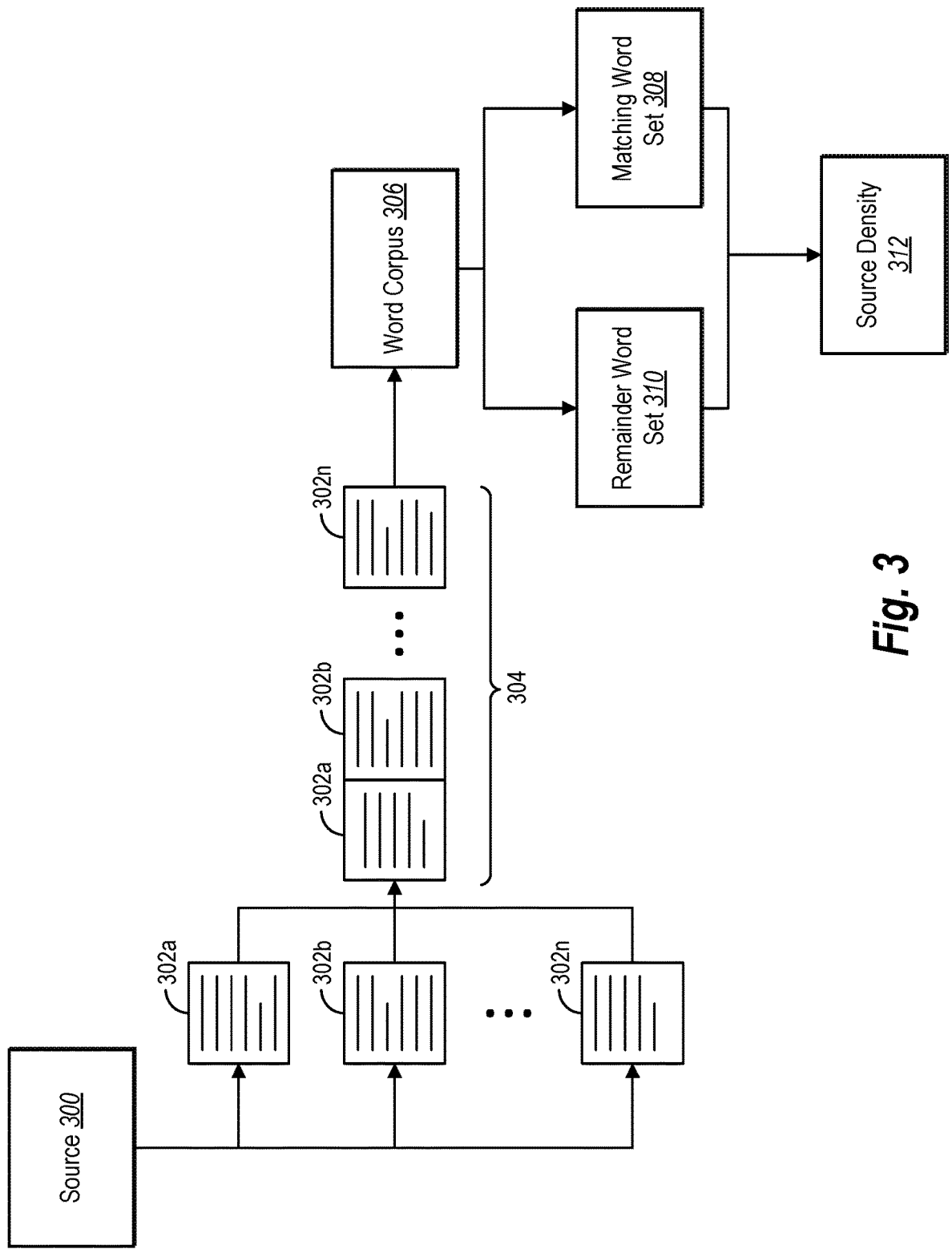
FIG. 3 illustrates a diagram of a process for determining a source density for a digital content source in accordance with one or more implementations.

As mentioned, the classification system 102 can determine source densities for different digital content sources. FIG. 3 illustrates additional detail regarding a process for determining a source density of a digital content source in accordance with one or more embodiments. As shown, the classification system 102 identifies a source 300 including digital content such as video, audio, images, text, or a combination of video, audio, images, or text. Furthermore, the digital content can include content stored in a variety of file formats including digital video formats, digital audio formats, digital image formats, or text formats (e.g., .txt, .doc, .pdf). In one or more embodiments, the classification system 102 accesses the digital content from the source by requesting the digital content from the source 300 via a network.

As shown in FIG. 3, the classification system 102 also determine a plurality of text documents 302a-302n corresponding to the digital content based on the corresponding formats of the digital content. For example, the classification system 102 can store a text document obtained from the source 300 in a content storage medium associated with the classification system 102. Additionally, the classification system 102 can analyze a text document to generate one or more text documents based on the digital content. To illustrate, the classification system 102 can analyze an HTML file that includes text to remove metadata or other content (e.g., HTML tags) to generate a text document including only visible text content.

In one or more embodiments, the classification system 102 analyzes other types of digital content to generate text documents using image, video, or audio analysis. For instance, the classification system 102 can generate text documents from .pdf files or image files (e.g., separate image files or individual video frames) that contain text using image analysis such as optical character recognition. The classification system 102 can also generate text documents from audio in video or audio files using speech-to-text processing. The classification system 102 can thus convert a plurality of types of digital content into text documents based on the specific media in the digital content using one or more digital content analysis processes.

As shown in FIG. 3, the classification system 102 determines a vocabulary for the source 300 based on the plurality of text documents 302a-302n. For example, the classification system 102 concatenates the text documents 302a-302n to generate a concatenated text document 304. As illustrated in FIG. 3, the concatenated text document 304 includes the plurality of text documents 302a-302n appended one after another to form a single document. The concatenated text document 304 thus include the text extracted from the source 300 in the text documents 302a-302n.

Using the concatenated text document 304, the classification system 102 determine a vocabulary for the source 300. In one or more embodiments, the classification system 102 determines the vocabulary by identifying words and phrases in the concatenated text document 304. For instance, the classification system 102 can identify words in the concatenated text document 304 that have a specific meaning as defined in one or more dictionaries or fields of study for a language corresponding to the text documents 302a-302n. Additionally, the classification system 102 can further identify n-grams, which is a contiguous sequence of n words, from the concatenated text document 304 to include in the vocabulary. To illustrate, the vocabulary can include bi-grams including combinations of two words that, combined, have a specific meaning. Furthermore, the classification system 102 can determine additional characteristics of the vocabulary, such as the frequency of certain words or n-grams in the concatenated text document 304.

Once the classification system 102 has determined the vocabulary for the source 300, the classification system 102 compares the vocabulary to a word corpus 306 to determine words and/or n-grams that are specific to one or more categories. In at least some embodiments, the word corpus 306 comprises a set of words and/or n-grams that the classification system 102 determines do not have an affinity towards any one or more categories. For example, the word corpus 306 can include the most frequently used words and/or n-grams in a larger set of words (e.g., the 20,000 most frequently used English words). Alternatively, the classification system 102 can generate the word corpus 306 using a pool of documents that the classification system 102 (or another system) determines are common to a plurality of categories (e.g., a threshold percentage of categories) and do not have an affinity towards any class.

The classification system 102 compares the vocabulary of the source 300 to the word corpus 306 by determining a matching word set 308 and a remainder word set 310. The matching word set 308 includes words from the vocabulary that occur within the word corpus 306, including repeating uses of words. The remainder word set 310 includes distinguishing words from the vocabulary, or in other words, words in the vocabulary that do not occur in the word corpus 306. The remainder word set 310 thus includes words that the classification system 102 determines are biased towards one or more categories from a plurality of possible categories.

After determining the remainder word set 310, the classification system 102 determines a source density 312 for the source 300. The source density 312 indicates how "dense" the source 300 is with words or phrases that indicate a bias towards one or more categories. For example, the classification system 102 can determine the source density 312 based on a proportion of distinguishing words in the vocabulary for the source 300 relative to the total number of words in the vocabulary. Accordingly, a higher proportion of distinguishing words (i.e., words in the remainder word set 310) results in a higher source density 312, and a lower proportion of distinguishing words results in a lower source density 312.

More specifically, according to one or more embodiments, the classification system 102 performs operations associated with determining source densities for a plurality of digital content sources by first identifying a set of documents $D=\{d_1, d_2, \ldots, d_n\}$, where n is the number of documents in the training dataset. In some embodiments, the documents are classified into a plurality of classes $C=C_1, C_2, C_3, \ldots, C_{|c|}$, where c is the number of classes. Additionally, each document can belong to more than one class.

The classification system 102 can generate a vocabulary of words and phrases from the documents including words and n-grams (e.g., bi-grams). In one or more embodiments, word/n-gram in the vocabulary has a unique index. The classification system 102 can collect the set of documents D from s sources. Additionally, the classification system 102 can determine densities of classification relevant words for the s sources $p_1, p_2, \ldots, p_s$ such that $p_1 < p_2 < \ldots < p_s$. Furthermore, in some embodiments the classification system 102 bins the documents D into s bins based on the corresponding sources of the documents.

The classification system 102 can concatenate the documents within a bin to form a single document $D_j$ for $j \in (1, \ldots, s)$. In some embodiments, the classification system 102 then creates a pool of documents PD (or, alternatively, a word corpus) including documents that are not biased toward any of the C classes and typically contain words of the language literature common among the C classes. According to one example, the algorithm for determining a source density $p_j$ is below:

$$p_j = \frac{|D_j - PD|}{|D_j|}$$

The classification system 102 can thus generate a density for each source based on the contents of the concatenated documents relative to the contents of the pool of documents or word corpus.

After the classification system 102 determines source densities for the sources corresponding to documents in the training dataset, the classification system 102 can use the source densities to generate document embeddings for the documents in the sources. FIG. 4A illustrates generating a document embedding from a text document in accordance with one or more embodiments. As described in more detail below, FIG. 4B illustrates word embeddings for different documents from different sources in accordance with one or more embodiments.

As shown in FIG. 4A, the classification system 102 obtains a text document 400 from a source. In one or more embodiments, the classification system 102 generates a document embedding based on an individual document from a source. For example, the classification system 102 can obtain a text document from a plurality of text documents corresponding to a digital content source. The classification system 102 can generate a separate document embedding for separate text documents. Alternatively, the classification system 102 can generate a document embedding based on a concatenated document from the source (e.g., based on combining documents from the source).

As illustrated in FIG. 4A, the classification system 102 generates a plurality of segments 402a-402n from the text document 400. As mentioned, each segment can be a sequence of indexes based on the mapping of words/n-grams from the distinguishing words for the source. According to one or more embodiments, the classification system 102 separates the text document 400 into the plurality of segments 402a-402n based on the source density of the source. To illustrate, the length of the segments 402a-402n is inversely proportional to the source density, such that the segments for a given source are of the same segment length.

As shown, the classification system 102 creates padded segments 404a-404n by padding the segments 402a-402n with a set of padding characters. In particular, the classification system 102 generates the padded segments 404a-404n to include a word portion (e.g., word portions 406a-406n) and a padded portion (e.g., padded portions 408a-408n). The word portions 406a-406n include the segments 402a-402n, which include the sequences of words/n-grams from the text document 400. The padded portions 408a-408n include sets of padding characters that extend the segments 402a-402n to the length of the padded segments 404a-404n. For example, the set of padding characters can include zeroes or other character(s) that the classification system 102 identifies as a padding character and that does not bias the padded segments 404a-404n toward any categories.

In one or more embodiments, the padded segments 404a-404n have a padded length (the length of the word portion and the length of the padded portion) that is the same for all the padded segments. Specifically, the classification system 102 can determine the padded length based on the lengths of the non-padded segments (segments 402a-402n) from a plurality of sources. For instance, the classification system 102 can determine the padded length to be longer than the length of the longest segment (e.g., the longest segment of the segments 402a-402n). Thus, when generating the padded portions 408a-408n, the classification system 102 adds a set of padding characters so that the padded segments 404a-404n have the same length.

As shown in FIG. 4, the classification system 102 then determines word embeddings 410a-410n based on the padded segments 404a-404n. For instance, the classification system 102 can generate the word embeddings 410a-410n to represent the padded segments 404a-404n based on the word portions 406a-406n of the padded segments 404a-404n. To illustrate, the classification system 102 can use a word embedding algorithm that embeds the words in the vocabulary of the source into dimensional arrays. The padded segments 404a-404n can thus include a plurality of dimensional arrays representing the word embeddings for words/n-grams corresponding to the word portions 406a-406n from the text document 400.

The classification system 102 then generates a document embedding 412 corresponding to the text document 400. In particular, the classification system 102 generates the document embedding 412 by combining the word embeddings 410a-410n from the padded segments 404a-404n. For example, the classification system 102 can determine the document embedding 412 by averaging the word embeddings 410a-410n corresponding to the n-grams present in the text document 400. The document embedding 412 can thus be an average vector of the dimensional arrays representing the word embeddings corresponding to the text document 400.

FIG. 4B illustrates various word embeddings for different sources in accordance with one or more embodiments. Specifically, a first word embedding 414 corresponds to a first source having a first source density. A second word embedding 416 corresponds to a second source having a second source density. A third word embedding 418 corresponds to a third source having a third source density. As illustrated, each word embedding has the same padded length (i.e., the same total length).

As also illustrated, the word embeddings have different lengths of word portions (e.g., word portions 420a-420c) and padded portions (422a-422c). To illustrate, the first word embedding 414 has a word portion 420a with a greater length than the word portion 420b of the second word embedding 416 but shorter than the word portion 420c of the third word embedding 418. Consequently, the first word embedding 414 has a padded portion 422a with a length shorter than the padded portion 422b of the second word embedding 416 but longer than the padded portion 422c of the third word embedding 418. This indicates that the source density of the first source is less than the source density of the second source and greater than the source density of the third source.

According to one or more embodiments, the process described above with respect to FIGS. 4A-4B includes dividing a concatenated document $D_j$ into text sequences, $Seq^k_{1,2,3} \ldots$ of $\alpha_k$ length (e.g., $\alpha_k$ n-grams), where $\alpha$ is a hyperparameter determined by the classification system 102. In particular, the classification system 102 can determine $\alpha$ as $\alpha_k \propto 1/p_k$ and $\alpha_1 > \alpha_2 > \ldots > \alpha_s$. The classification system 102 can convert documents into a sequence of indexes based on the mapping of the vocabularies corresponding to the sources. In one or more embodiments, the classification system 102 pads the sequences with zeroes such that the sequences have a size/length of DocLen, s.t.DocLen>max $(\alpha_1, \alpha_2, \ldots, \alpha_s)$. Additionally, the document sequences can be represented as Doc={$Doc_1, Doc_2, \ldots, Doc_m$} where m is the number of sequences created. In the context of C classes, $Doc_i$ represents a set of documents for a class $C_i$.

The classification system 102 can generate a document embedding from the created sequences. In one or more embodiments, the classification system 102 embeds each word in the vocabulary for a document into an $emb_D$ dimensional array. The classification system 102 can then create a document embedding that is calculated as the average vector of all the word embeddings present in the document. In some embodiments, the document embedding includes the padding information from the sequences from the document so that the document embedding include an indication of the source density of the corresponding source.

Figure 5:
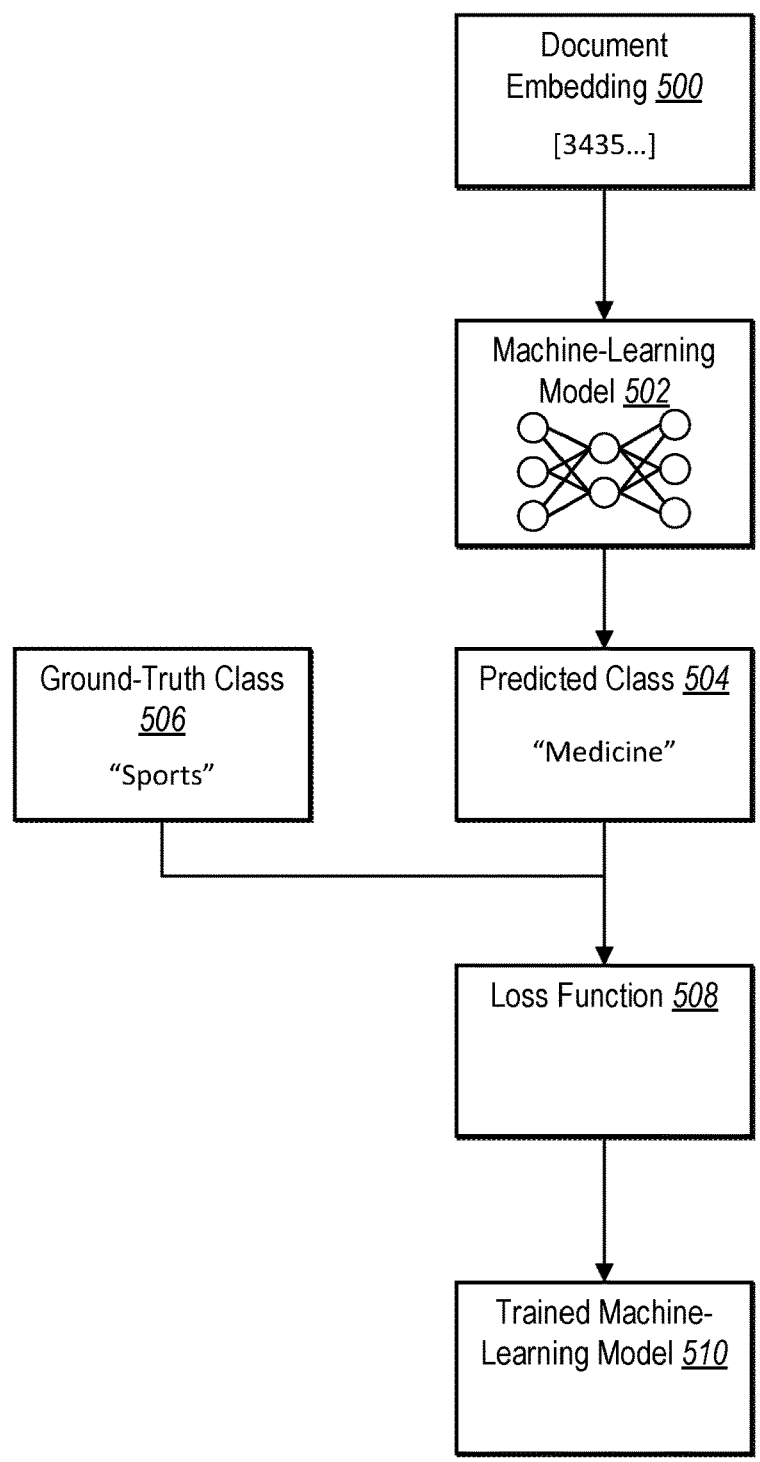
FIG. 5 illustrates a diagram of a process for training a machine-learning model using document embeddings in accordance with one or more implementations.

Once the classification system 102 has generated the document embedding for a document (e.g., for a concatenated text document from a source), the classification system 102 can train a machine-learning model to classify new digital content. FIG. 5 illustrates training a machine-learning model in accordance with one or more embodiments. Specifically, the classification system 102 trains a machine-learning model to classify digital content by teaching the machine-learning model to take into account the quality of the digital content according to the density of classification relevant words of a source of the digital content.

As illustrated in FIG. 5, the classification system 102 analyzes a document embedding 500 utilizing a machine-learning model 502. The document embedding 500 represents a text document corresponding to digital content from a digital content source in a training dataset. The classification system 102 uses the machine-learning model 502 to generate a predicted class 504 for the document embedding. For instance, the classification system 102 can predict a class from a plurality of classes based on a vector representing the vocabulary of the text document (e.g., the document embedding 412).

To illustrate, the machine-learning model 502 can determine scores (e.g., probabilities) for the plurality of classes based on the document embedding 500. The classification system 102 can then select a class based on the score of the class. For example, the classification system 102 can select a class with the highest score from the output of the machine-learning model 502. In at least some implementations, the classification system 102 predicts a class only if the score meets a predetermined threshold. If none of the classes have scores that meet the predetermined threshold, the classification system 102 can determine that the digital content corresponding to the document embedding is not polarized toward any class.

Additionally, while FIG. 5 illustrates the classification system 102 predicting a single class for the document embedding 500, the classification system 102 can predict a plurality of classes based on the generated scores. For example, the classification system 102 can predict a plurality of classes in response to determining that corresponding scores of the classes meet the predetermined threshold. This indicates that the digital content corresponding to the document embedding 500 is polarized toward the plurality of selected classes, rather than to a single class (or no class).

After generating the predicted class 504 for the document embedding 500, the classification system 102 compares the predicted class 504 to a ground-truth class 506 associated with the document embedding 500. Specifically, the classification system 102 can identify ground-truth classes (e.g., manually labeled classes) for each digital content item in a training dataset. The classification system 102 can thus use manually labeled ground-truth classes in the training dataset to compare to predicted classes for the digital content in the training dataset. Based on the comparison between the predicted class 504 and the ground-truth class 506, the classification system 102 determines a loss function 508 (e.g., a cross-entropy loss function) that indicates the differences between the predicted class 504 and the ground-truth class 506.

The classification system 102 uses the loss function 508 to produce a trained machine-learning model 510. In particular, the classification system 102 can produce the trained machine-learning model 510 by modifying parameters of the machine-learning model 502 to reduce the difference between the predicted class 504 and the ground-truth class 506. For instance, the classification system 102 can perform an iterative process of predicting a class for the document embedding 500, comparing the predicted class to the ground-truth class 506, and backpropagating to the trained machine-learning model 510 to further improve the classification system 102.

For example, in some embodiments, the classification system 102 inputs a document embedding (e.g., an average embedding vector representing the word embeddings present in a corresponding document) to a machine-learning model (e.g., a neural network) with h hidden layers and alternated by a rectified linear unit (ReLU) activation function and C nodes in the output layer, each passed through sigmoid activation. Additionally, the classification system 102 can train the model using backpropagation and cross-entropy loss. In one or more embodiments, the classification system 102 utilizes a modified FastText machine-learning model, as described by Joulin, A., Grave, E., Bojanowski, P. and Mikolov, T., in Bag of Tricks for Efficient Text Classification. arXiv preprint arXiv:1607.01759 (2016), which is incorporated by reference in its entirety here.

By utilizing padded segments based on source density of different sources, the classification system 102 can emphasize training documents with high source densities relative to training documents with low source densities. Indeed, by providing more padding in relation to high density sources, the intensity of every embedding increases (e.g., the word portion of the embedding has a more significant intensity on the training). In contrast, by providing more padding in relation to low density sources, the intensity of every embedding decreases in training the machine learning model. Thus, the system learns more quickly from high density sources, which causes the machine learning model to improve in accuracy and converge more efficiently.

In one or more embodiments, the classification system 102 uses backpropagation with a cross-entropy loss:

$$L = p \log \hat{p} + (1-p)\log(1-\hat{p})$$

where p is the ground-truth label of the document and $\hat{p}$ is the predicted probability of a document belonging to a particular class. By analyzing using backpropagation, the classification system 102 has an output layer input as:

$$\frac{\partial \Sigma w^j emb}{\partial w_i} = \sum_{batch} emb_i$$

$$emb_i = \frac{1}{DocLen} \sum_{j<DocLen} word_{ij}$$

Specifically, the classification system 102 obtains a score for every dimension of the embeddings and backpropagates the scores for the dimensions to obtain an orientation of each dimension towards each of a plurality of classes.

As a result of backpropagating the losses using document embeddings with the padding based on the source density, as described previously, embeddings with large amounts of padding have a lower intensity in $emb_i$, where i is the ith dimension of the averaged embedding. If the document is a positive example for a class, the resulting loss is high.

Accordingly, the model learns a larger weight for that dimension to give higher activation at the node. Furthermore, smaller, dense, high quality articles have larger weights in some dimensions.

In contrast, when the classification system 102 feeds a large article belonging to lower quality material (with small amounts of padding) into the model, the intensity is high, resulting in a lower magnitude of gradient of the sigmoid activation. Because of the chain rule of backpropagation, the impact of low quality articles is relatively small. Thus, words/n-grams that occur often in the context of documents pertaining to different classes (e.g., common words) often have low dimensional values, while words that strongly represent a class have high values in some dimensions of the embedding. Furthermore, some words/n-grams support a combination of classes and are often reflected in some dimensions that are moderately high in those classes. Additionally, some words in the vocabulary may also be negatively correlated with other classes (e.g., by having negative values in dimensions having high weights for certain classes).

As mentioned above, the classification system 102 can improve accuracy relative to conventional systems. Researchers have conducted experiments to establish such improvements. In particular, researchers compared some embodiments of the training methods described herein to the use of a standard FastText embedding model (see, e.g., https://fasttext.cc) and a TextCNN model (convolutional neural networks for sentence classification). The classification system 102 tested an exemplary model on 618 documents not used during training or validation including books, websites, blogs, etc. In some embodiments, techniques described herein improve exact match accuracy over standard FastText by ~13%, as shown in the table below.

| System | Exact Match Accuracy (%) | Categorical Accuracy (%) |
|---|---|---|
| System using exemple Word Padding based on Source Density | 53 | 69.1 |
| FastText | 40 | 59 |
| TextCNN | 40 | 58 |

Figure 6:
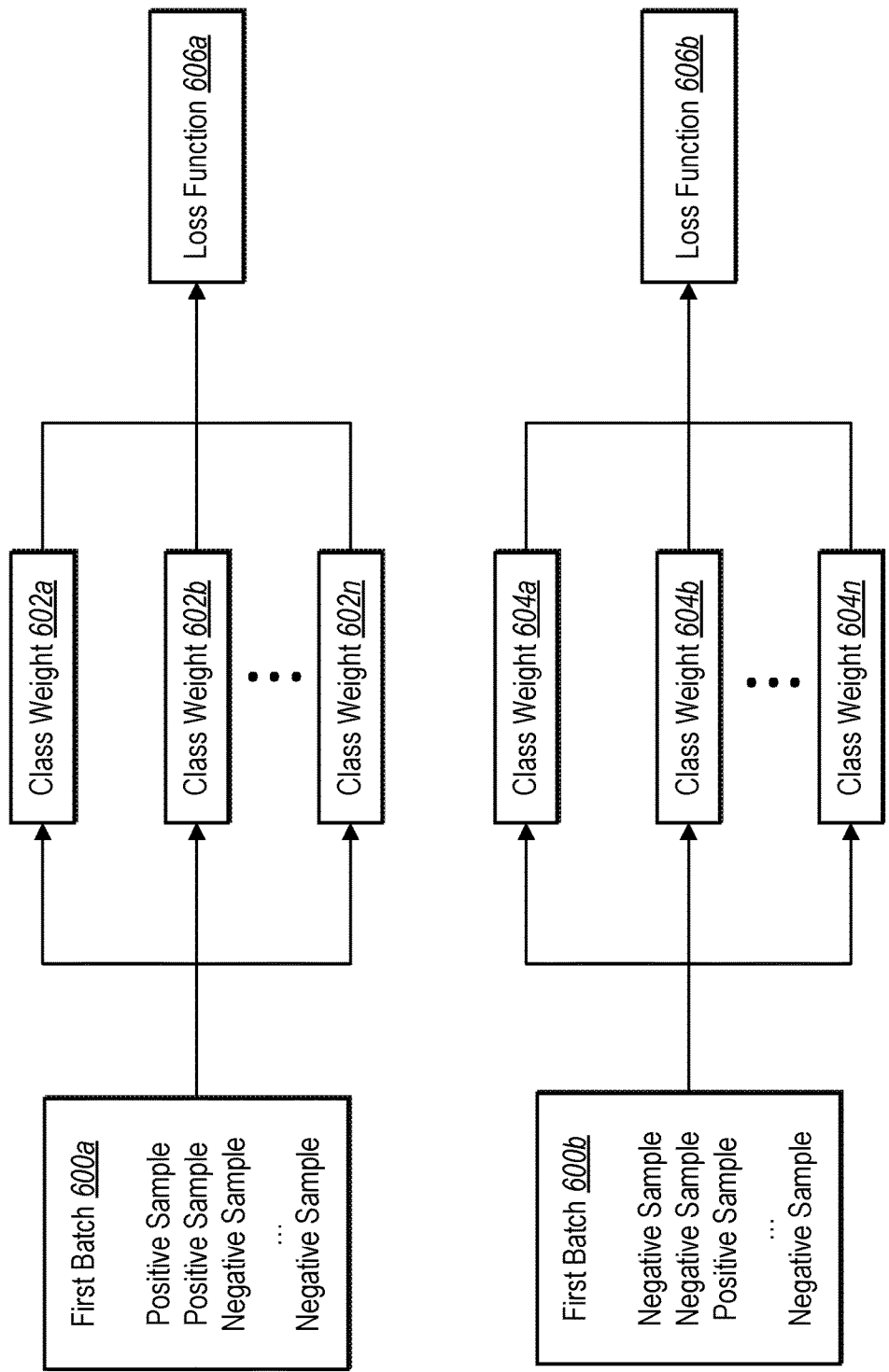
FIG. 6 illustrates a diagram of a process for generating loss functions from a machine-learning model using batchwise weighting in accordance with one or more implementations.

As mentioned, in one or more embodiments, the classification system 102 uses a batchwise weighted cross-entropy loss determination when training a machine-learning model to classify digital content. In particular, the classification system 102 can train the machine-learning model in batches that include subsets of training samples (e.g., sixty-four documents at a time rather than training on the entire training dataset at once). For instance, the classification system 102 can select samples randomly corresponding to a plurality of classes for training within each batch of training samples. The classification system 102 can use different weights for the classes across batches to account for different proportions of samples in the different classes within each batch. FIG. 6 illustrates determining different weights for classes on a per-batch basis while training a machine-learning model in accordance with one or more embodiments.

As shown in FIG. 6, the classification system 102 identifies a plurality of samples for a first batch 600a and a plurality of samples for a second batch 600b. Because each batch includes a randomly selected set of samples from a larger training dataset, each set of samples can also have different proportions of samples from each class, and different proportions of positive/negative samples for each class. To illustrate, the classification system 102 can determine, for a batch (e.g., the first batch 600*a*), that the proportion of samples corresponding to a first class is 20%, the proportion of samples corresponding to a second class is 5%, etc. Similarly, the classification system 102 can determine for a different batch (e.g., the second batch 600*b*), that the proportion of samples corresponding to the first class is 10%, the proportion of samples corresponding to the second class is 15%, etc., such that the proportions of each class in the different batches varies.

In one or more embodiments, the classification system 102 also determines, for a cross-entropy loss determination, whether each sample is a positive sample for a class or a negative sample for a class. Based on the proportion of positive samples within a given class and within a given batch, the classification system 102 determines a class weight for the given class. For example, the classification system 102 can generate a plurality of class weights 602*a*-602*n* for a plurality of classes within the first batch 600*a* based on the proportion of positive samples for each class within the first batch 600*a*. The classification system 102 can also generate a plurality of class weights 604*a*-604*n* for the plurality of classes within the second batch 600*b* based on the proportion of positive samples for each class within the second batch 600*b*.

In one example, the classification system 102 determines a first class weight 602*a* for a class based on the proportion of positive samples of the class in the first batch 600*a*. The classification system 102 also determines a second class weight 604*a* for the class based on the proportion of positive samples of the class in the second batch 600*b*. If the proportion of samples for the class are different in the first batch 600*a* and the second batch 600*b*, the first class weight 602*a* and the second class weight 604*a* have different values. Otherwise, the first class weight 602*a* and the second class weight 604*a* may have the same value if the proportions are the same.

The classification system 102 then uses the class weights for each batch to determine a loss function that is specific to that batch of training samples. To illustrate, the classification system 102 can generate a first loss function 606*a* for the first batch 600*a* based on the corresponding plurality of class weights 602*a*-602*n*. Additionally, the classification system 102 can generate a second loss function 606*b* for the second batch 600*b* based on the corresponding plurality of class weights 604*a*-604*n*. The loss functions for each batch thus incorporate the different weightings associated with the classes to accurately incorporate both positive and negative samples for each class and within each separate batch of training samples, which can help minimize false positives/negatives.

According to one example of batchwise weighted loss determination, the classification system 102 determines, for each batch of training samples, the proportion $p_c$ of positive samples to the batch size for a category c as:

$$p_c = \frac{\#positive}{\#positive + \#negative}$$

The classification system 102 further determines the ratio of importance of optimizing for false positive to false negative as $\alpha$, which is a hyperparameter for the model. In one or more embodiments, the classification system 102 weighs penalizing false positives and false negatives equally, in which case $\alpha=1$. Furthermore, $\lambda_c$ is the weight to balance the false positives and false negatives during loss calculation, defined for each category as:

$$\lambda_c = \frac{1 - p_c}{\alpha p_c}$$

Furthermore, if #positive is 0, then $\lambda_c$ is set to 1 as an engineering parameter to smooth $\lambda_c$. An activation function, $f(\lambda)$ attenuates the parameter $\lambda$ to rectify numerical instability of the loss function, which is a weighted cross entropy loss with weights determined dynamically in each batch depending on the proportion of samples of each class. The class of functions that can be used as $f$ is constrained by:

$$f \text{ s.t. } \lim_{x \to \infty} \frac{f(x)}{x} = 0, f(0) = 1,$$

$f$ is monotonically increasing, continuous $\forall x \in \mathbb{R}, x > 0$ The batchwise weighted cross-entropy loss is thus:

$$\text{Loss} = \frac{f(\lambda) p \log(p') + (1 - p) \log(1 - p')}{f(\lambda) + 1}$$

and the $f$ function is:

$$f(x) = \log_e(x + e)$$

As mentioned above, the classification system 102 improves accuracy relative to conventional systems. Researchers have conducted experiments to establish such improvements. In particular, researchers measured the impact of the batchwise weighted cross-entropy loss function with the FastText embedding algorithm relative to the use of the FastText embedding algorithm alone. The classification system 102 trained a model on 270,000 documents and tested that model on 618 documents not used during training or validation. In some embodiments, the batchwise weighted cross-entropy loss determination improved the exact match accuracy over FastText alone by ~11%, as shown in the table below.

| Algorithm | Exact Match Accuracy (%) | Categorical Accuracy (%) |
| --- | --- | --- |
| FastText + Batchwise Weighted Cross-Entropy | 35.01 | 51.57 |
| FastText | 24.51 | 35.40 |

Once the classification system 102 has trained a machine-learning model using the document embeddings based on source densities described herein, the classification system 102 can then apply that machine-learning model to new digital content. For instance, when identifying new digital content, the classification system 102 can generate (or otherwise determine) a text document representing the digital content. The classification system 102 can then apply dummy padding to obtain a specific padded segment length, rather than padding based on the source of the digital content. To illustrate, the classification system 102 can set a desired padded length of document segments to 800. If, for example, the segments for the text document have 600-700 words, the classification system 102 can add a set of padding characters to obtain a specified padded segment of 800 n-grams (e.g., 100-200 padding characters). Alternatively, the classification system 102 can apply a predetermined amount of dummy padding such as adding 100 characters to any segment.

Figure 7:
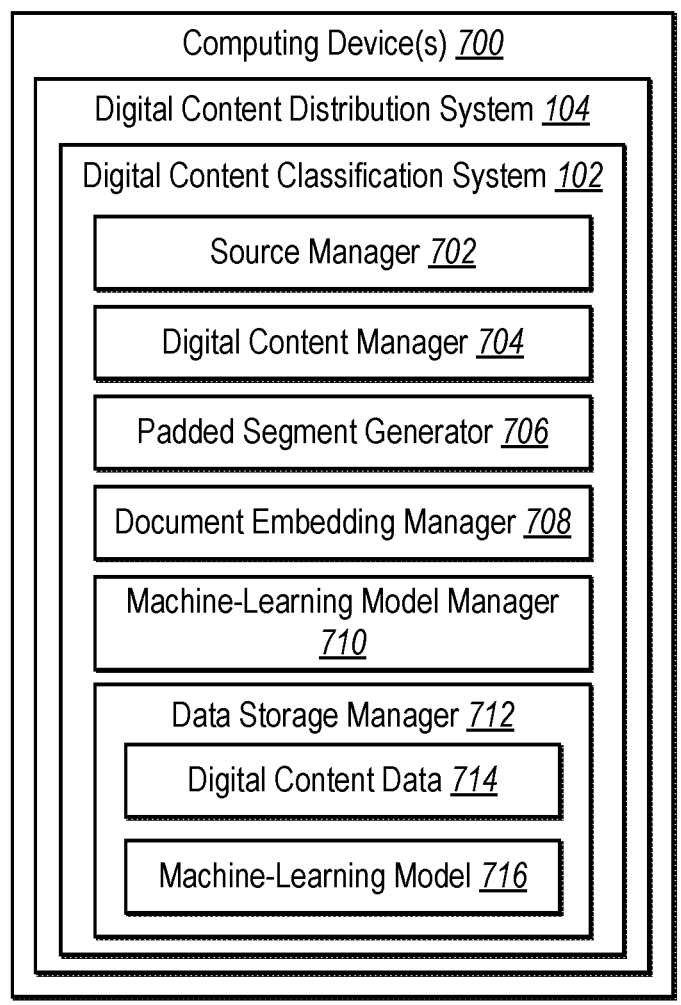
FIG. 7 illustrates a diagram of the digital content distribution system of FIG. 1 in accordance with one or more implementations.

As described in relation to FIGS. 1-6, the digital content classification system 102 can perform operations for training machine-learning classifiers. FIG. 7 illustrates a schematic diagram of an embodiment of the digital content classification system 102 in accordance with one or more embodiments. As shown, the digital content classification system 102 can be implemented within a digital content distribution system 114 on computing device(s) 700 (e.g., a client device and/or server device as described in FIG. 1 and as further described below in relation to FIG. 9). Additionally, the digital content classification system 102 can include, but is not limited to, a source manager 702, a digital content manager 704, a padded segment generator 706, a document embedding manager 708, a machine-learning model manager 710, and a data storage manager 712. The digital content classification system 102 can be implemented on any number of computing devices. For example, the digital content classification system 102 can be implemented in a distributed system of server devices for training a utilizing machine-learning classifiers for content curation. Alternatively, the digital content classification system 102 can be implemented on a single computing device such as a single client device running a client application that performs digital content analysis.

In one or more embodiments, each of the components of the digital content classification system 102 is in communication with other components using any suitable communication technologies. Additionally, the components of the digital content classification system 102 can be in communication with one or more other devices including other computing devices of a user, server devices (e.g., cloud storage devices), licensing servers, or other devices/systems. It will be recognized that although the components of the digital content classification system 102 are shown to be separate in FIG. 7, any of the subcomponents may be combined into fewer components, such as into a single component, or divided into more components as may serve a particular implementation. Furthermore, although the components of FIG. 7 are described in connection with the digital content classification system 102, at least some of the components for performing operations in conjunction with the digital content classification system 102 described herein may be implemented on other devices within the environment.

The components of the digital content classification system 102 can include software, hardware, or both. For example, the components of the digital content classification system 102 can include one or more instructions stored on a computer-readable storage medium and executable by processors of one or more computing devices (e.g., the computing device(s) 700). When executed by the one or more processors, the computer-executable instructions of the digital content classification system 102 can cause the computing device(s) 700 to perform the content curation operations described herein. Alternatively, the components of the digital content classification system 102 can include hardware, such as a special purpose processing device to perform a certain function or group of functions. Additionally, or alternatively, the components of the digital content classification system 102 can include a combination of computer-executable instructions and hardware.

Furthermore, the components of the digital content classification system 102 performing the functions described herein with respect to the digital content classification system 102 may, for example, be implemented as part of a stand-alone application, as a module of an application, as a plug-in for applications including marketing applications, as a library function or functions that may be called by other applications, and/or as a cloud-computing model. Thus, the components of the digital content classification system 102 may be implemented as part of a stand-alone application on a personal computing device or a mobile device. Alternatively, or additionally, the components of the digital content classification system 102 may be implemented in any application that allows machine-learning content classification, including, but not limited to ADOBE® CAPTIVATE® PRIME®, ADOBE® DOCUMENT CLOUD®, and ADOBE® EXPERIENCE MANAGER® software. "ADOBE," "CAPTIVATE," "ADOBE CAPTIVATE PRIME," "ADOBE DOCUMENT CLOUD," and "ADOBE EXPERIENCE MANAGER" are registered trademarks of Adobe Systems Incorporated in the United States and/or other countries.

As mentioned, the classification system 102 includes a source manager 702 that facilitates the management of digital content sources. For example, as illustrated in FIG. 1, the classification system 102 can manage a plurality of digital content sources. The source manager can also manage information associated with each of the digital content sources, such as network locations (e.g., URLs), authentication information, or other information that the classification system 102 utilizes to obtain content from the digital content sources.

The classification system 102 also includes a digital content manager 704 to facilitate obtaining and managing digital content from a plurality of digital content sources. The digital content manager 704 can obtain audio, video, images, or text from digital content sources. The digital content manager 704 can also convert or extract text from digital content to determine text documents representing the digital content. The digital content manager 704 can also facilitate concatenation of text documents for digital content corresponding to a source.

The classification system 102 further includes a padded segment generator 706 to facilitate padding of segments from text documents corresponding to digital content from a plurality of sources. The padded segment generator 706 can use information about the sources (e.g., the source densities) to split text documents into segments of word/n-gram sequences. The padded segment generator 706 can further apply padding to the segments of word/n-gram sequences to create padded segments for a plurality of text documents across the plurality of sources.

Additionally, the classification system 102 includes a document embedding manager 708 to facilitate the creation of document embeddings representing text documents. In particular, the document embedding manager 708 can create word embeddings for words in a vocabulary corresponding to a digital content source. The document embedding manager 708 can then create one or more document embeddings based on the word embeddings for the digital content source (e.g., based on a concatenated document or a plurality of individual documents from the source).

The classification system 102 also includes a machine-learning model manager 710 to facilitate training a machine-learning model. The machine-learning model manager 710 can use document embeddings from the document embedding manager 708 as inputs to the machine-learning model.

The machine-learning model manager 710 can then use outputs of the model to determine loss function(s) (e.g., by comparing to ground-truth values) and then train the model based on the loss function(s). The machine-learning model manager 710 can also facilitate the application of the machine-learning model to new documents.

The digital content classification system 102 also includes a data storage manager 712 that stores and maintains data associated with training and using a machine-learning model for classifying digital content. In particular, the data storage manager 712 can be implemented as part of one or more memory devices (e.g., storage media devices as described in greater detail below that store instructions, code, databases, or other data structures for the digital content classification system 102). For example, the data storage manager 712 can store digital content data 714 corresponding to digital content from a plurality of digital content sources and a machine-learning model 716. The data storage manager 712 can also store training data (e.g., losses associated with predicted classes and ground-truth classes). In some embodiments, the data storage manager 712 stores text documents from a first digital content source, text documents from a second (or additional) digital content source, a word corpus, and/or a machine-learning model.

Figure 8:
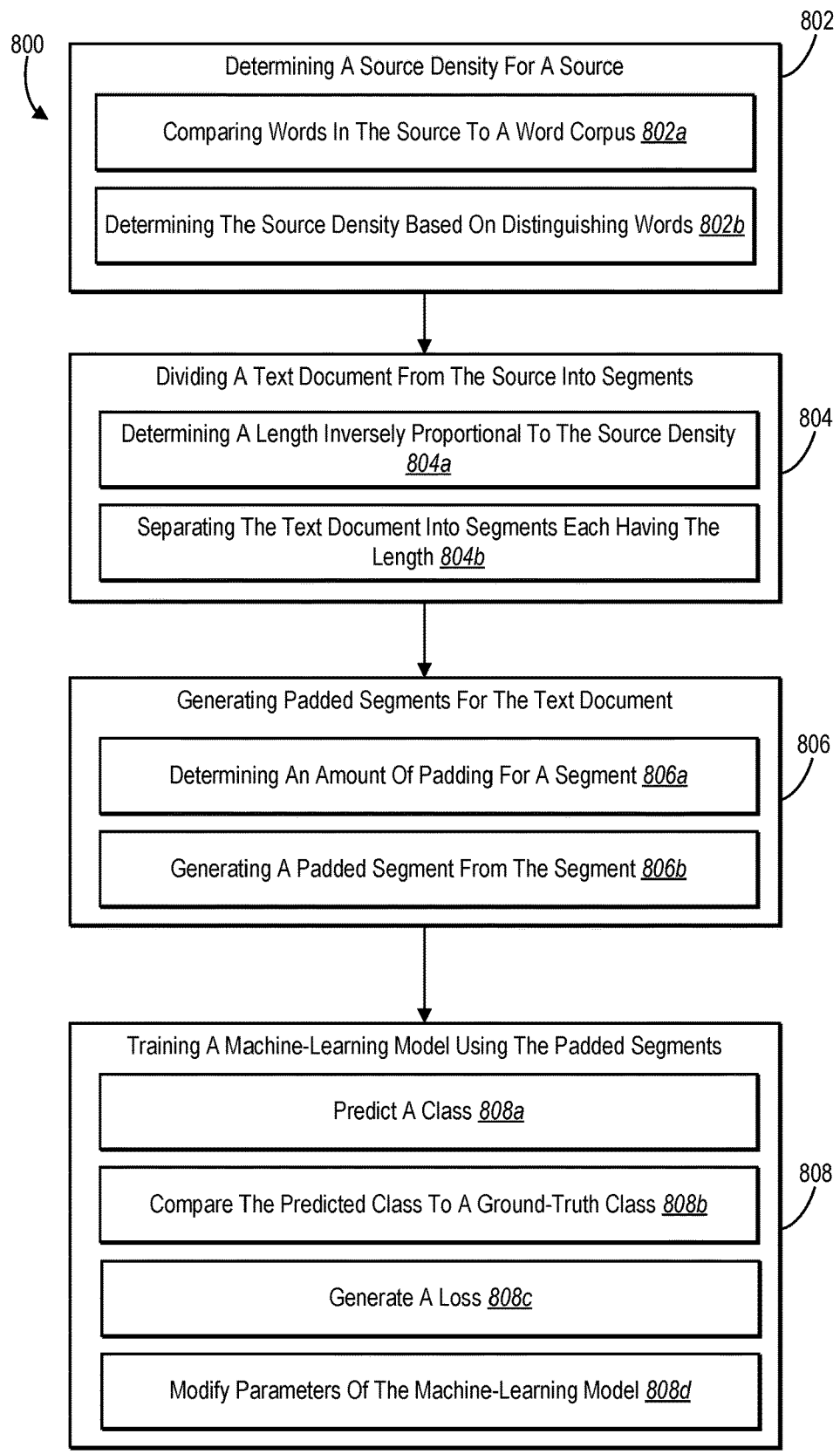
FIG. 8 illustrates a flowchart of a series of acts for training machine-learning classifiers on imbalanced training data in accordance with one or more implementations.

Turning now to FIG. 8, this figure shows a flowchart of a series of acts 800 of training machine-learning classifiers on imbalanced training data. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer readable medium can comprise instructions, that when executed by one or more processors, cause a computing device to perform the acts of FIG. 8. In still further embodiments, a system can perform the acts of FIG. 8.

As shown, the series of acts 800 includes an act 802 of determining a source density for a source. For example, act 802 involves determining, for a digital content source of a plurality of digital content sources, a source density based on comparing words in text documents from the digital content source to a word corpus. Act 802 can involve concatenating the text documents from the source into a concatenated text document.

Act 802 can include an act 802a of comparing words in the source to a word corpus. For example, act 802a can involve comparing words in the concatenated text document to the word corpus to determine a set of distinguishing words for the source. The set of distinguishing words can include words from the source that are biased toward one or more classes of a plurality of classes.

Act 802 can further include an act 802b of determining the source density based on distinguishing words. For example, act 802b can involve determining the source density for the source by comparing the set of distinguishing words with words in the concatenated text document. Act 802b can involve determining the source density by determining a proportion of the set of distinguishing words relative to words in the concatenated text document.

The classification system 102 can determine source densities for a plurality of different digital content sources. To illustrate, in some embodiments, the act 802 can include determining a first source density for a first digital content source by determining a first ratio of distinctive words in text documents from the first digital content source relative to the word corpus. In addition, the act 802 can include determining a second source density for the second digital content source by determining a second ratio of distinctive words in the text documents from the second digital content source relative to the word corpus. For example, the classification system 102 can determine a ratio by dividing the number of distinctive words (i.e., words from the text documents that do not appear in the word corpus) by the number of individual/unique words in the text documents.

The series of acts 800 includes an act 804 of dividing a text document from the source into segments. For example, act 804 involves dividing a text document from the digital content source into a plurality of segments having a length determined based on the source density. Specifically, act 804 can include an act 804a of determining a length inversely proportional to the source density. Furthermore, act 804 can include an act 804b of separating the text document into segments each having the length. Accordingly, the length of each segment of the plurality of segments from the text document is inversely proportional to the source density.

The series of acts 800 can also include determining, for an additional digital content source of the plurality of digital content sources, an additional source density based on comparing words in additional text documents from the additional digital content source to the word corpus. The series of acts 800 further include dividing the additional text documents from the additional digital content source into a plurality of segments having an additional length determined based on the additional source density. Additionally, the series of acts 800 includes generating a plurality of additional padded segments having the padded segment length by adding an additional set of padding characters to the plurality of segments for the additional text documents from the additional source. For example, a padded segment of the padded segments from the text documents comprises a word portion and a padded portion, the padded portion comprising a set of padding characters. Furthermore, a length of the padded portion can include a length determined based on a source density for a corresponding digital content source of the plurality of digital content sources, the source density reflecting a number of classification-specific words in text documents from the corresponding digital content source.

Additionally, the series of acts 800 includes an act 806 of generating padded segments for the text document. For example, act 806 involves generating a plurality of padded segments having a padded segment length by adding a set of padding characters to the plurality of segments for the text document from the digital content source. Act 806 can involve an act 806a of determining an amount of padding for a segment. For example, act 806a can involve determining the amount of padding for the segment based on source densities for a plurality of digital content sources. Act 806 can also involve an act 806b of generating a padded segment from the segment. In one or more embodiments, act 806b can involve generating a padded segment of the plurality of padded segments to include a first portion based on one or more words from the text document and a second portion comprising the set of padding characters.

The act 806 can also include generating different padded segments for different text documents from different sources. For example, the act 806 can include generating a first padded segment from a first text document from the first digital content source by appending padding characters to a segment from the first text document, wherein the first padded segment comprises a first padded portion having a first length determined based on the first source density. Moreover, the act 806 can include generating a second padded segment from a second text document from the second digital content source by appending padding characters to a segment from the second text document, wherein the second padded segment comprises a second padded portion having a second length determined based on the second source density.

The series of acts 800 further includes an act 808 of training a machine-learning model using the padded segments. For example, act 808 involves training a machine-learning model to classify documents based on the plurality of padded segments. Act 808 can include an act 808*a* of predicting a class. For example, act 808*a* can involve predicting a class for a padded segment of the plurality of padded segments. Act 808 can include an act 808*b* of comparing the predicted class to a ground-truth class. For example, act 808*b* can involve comparing the predicted class to a ground-truth class for the text document from the digital content source. Act 808 can also include an act 808*c* of generating a loss. For example, act 808*c* can involve generating a loss from an output of the machine-learning model based on a difference between the predicted class and the ground-truth class for the text document from the source. Act 808 can also include an act 808*d* of modifying parameters of the machine-learning model. For example, act 808*d* can involve modifying parameters of the machine-learning model based on the loss from the output of the machine-learning model.

Act 808 can also involve determining, for a batch of training documents, a batchwise weight for a class of a plurality of classes based on a proportion of positive samples in the class within the batch. Act 808 can also involve generating, for the batch, a loss from an output of the machine-learning model using the batchwise weight for the class. Furthermore, act 808 can involve determining, for the batch of training documents, an additional batchwise weight for an additional class of an additional plurality of classes based on a proportion of positive samples in the additional class within the batch. Act 808 can also involve generating, for the batch, the loss from the output of the machine-learning model using the additional batchwise weight for the additional class.

Additionally, act 808 can involve determining, for an additional batch of training documents, an additional batchwise weight for the class of the plurality of classes based on a proportion of positive samples in the class within the additional batch. Act 808 can then involve generating, for the additional batch, a loss from an additional output of the machine-learning model using the additional batchwise weight for the class.

Act 808 can also involve generating a plurality of word embeddings from padded segments corresponding to an identified document of the text documents from the source. Act 808 can further involve determining a document embedding for the identified document by combining the plurality of word embeddings for the identified document. Act 808 can further involve training the machine-learning model using the document embedding as an input to the machine-learning model.

In some embodiments, the series of acts 800 can include a step for generating padded segments from the text documents reflecting source densities of the plurality of digital content sources relative to the classification neutral word corpus. For example, the acts and algorithms described above with reference to FIGS. 2, 3, and 4A-4B can comprise the corresponding structure for performing a step for generating padded segments from the text documents reflecting source densities of the plurality of digital content sources relative to the classification neutral word corpus.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A network is one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. Cloud computing is a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. A "cloud-computing environment" is an environment in which cloud computing is employed.

Figure 9:
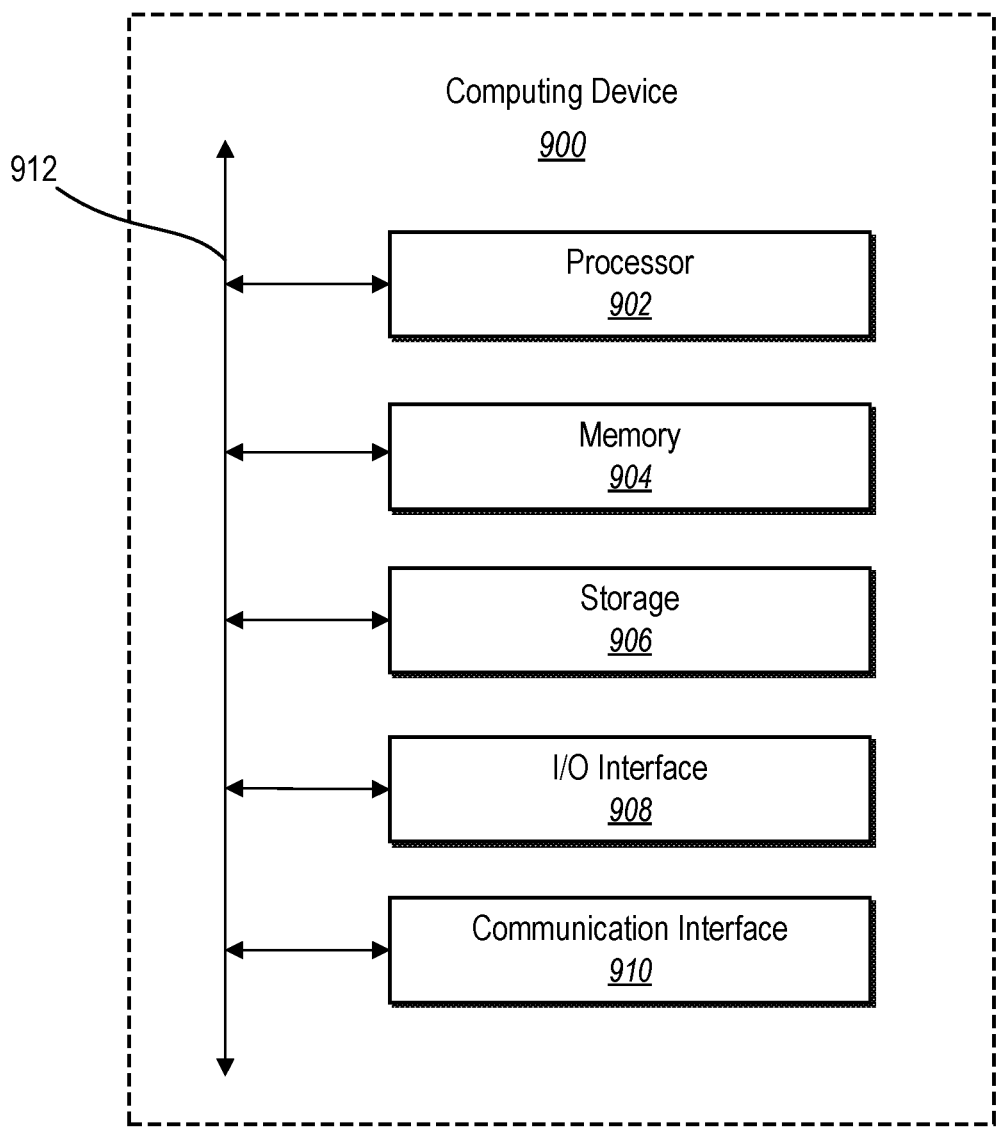
FIG. 9 illustrates a block diagram of an exemplary computing device in accordance with one or more embodiments.

FIG. 9 illustrates a block diagram of exemplary computing device 900 that may be configured to perform one or more of the processes described above. One will appreciate that one or more computing devices such as the computing device 900 may implement the multi-RNN prediction system. As shown by FIG. 9, the computing device 900 can comprise a processor 902, a memory 904, a storage device 906, an I/O interface 908, and a communication interface 910, which may be communicatively coupled by way of a communication infrastructure 912. In certain embodiments, the computing device 900 can include fewer or more components than those shown in FIG. 9. Components of the computing device 900 shown in FIG. 9 will now be described in additional detail.

In one or more embodiments, the processor 902 includes hardware for executing instructions, such as those making up a computer program. As an example, and not by way of limitation, to execute instructions for dynamically modifying workflows, the processor 902 may retrieve (or fetch) the instructions from an internal register, an internal cache, the memory 904, or the storage device 906 and decode and execute them. The memory 904 may be a volatile or non-volatile memory used for storing data, metadata, and programs for execution by the processor(s). The storage device 906 includes storage, such as a hard disk, flash disk drive, or other digital storage device, for storing data or instructions for performing the methods described herein.

The I/O interface 908 allows a user to provide input to, receive output from, and otherwise transfer data to and receive data from computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example, and not by way of limitation, the communication interface 910 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 910 may facilitate communications with various types of wired or wireless networks. The communication interface 910 may also facilitate communications using various communication protocols. The communication infrastructure 912 may also include hardware, software, or both that couples components of the computing device 900 to each other. For example, the communication interface 910 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computer system to:
   determine, for a digital content source of a plurality of digital content sources, a source density based on comparing words in text documents from the digital content source to a word corpus;
   divide a text document from the digital content source into a plurality of segments, wherein each segment of the plurality of segments has a length determined based on the source density;
   generate, from the plurality of segments, a plurality of padded segments by adding a set of padding characters to each segment of the plurality of segments for the text document from the digital content source, wherein each padded segment of the plurality of padded segments has a padded segment length; and
   train a machine-learning model to classify documents based on the plurality of padded segments.

2. The non-transitory computer readable storage medium as recited in claim 1, further comprising instructions that, when executed by the at least one processor, cause the computer system to:
   determine, for an additional digital content source of the plurality of digital content sources, an additional source density based on comparing words in additional text documents from the additional digital content source to the word corpus; and
   divide the additional text documents from the additional digital content source into a plurality of segments having an additional length determined based on the additional source density, wherein the additional length determined based on the additional source density is different than the length determined based on the source density.

3. The non-transitory computer readable storage medium as recited in claim 2, further comprising instructions that, when executed by the at least one processor, cause the computer system to generate a plurality of additional padded segments having the padded segment length by adding an additional set of padding characters to the plurality of segments for the additional text documents from the additional digital content source.

4. The non-transitory computer readable storage medium as recited in claim 1, wherein the instructions that cause the computer system to train the machine-learning model cause the computer system to:
   predict a class for a padded segment of the plurality of padded segments;
   compare the predicted class to a ground-truth class for the text document from the digital content source;
   generate a loss from an output of the machine-learning model based on a difference between the predicted class and the ground-truth class for the text document from the digital content source; and
   modify parameters of the machine-learning model based on the loss from the output of the machine-learning model.

5. The non-transitory computer readable storage medium as recited in claim 4, wherein the instructions that cause the computer system to generate the loss cause the computer system to:
   determine, for a batch of training documents, a batchwise weight for a class of a plurality of classes based on a proportion of positive samples in the class within the batch; and
   generate, for the batch, the loss from the output of the machine-learning model using the batchwise weight for the class.

6. The non-transitory computer readable storage medium as recited in claim 5, wherein the instructions that cause the computer system to train the machine-learning model cause the computer system to:
   determine, for the batch of training documents, an additional batchwise weight for an additional class of an additional plurality of classes based on a proportion of positive samples in the additional class within the batch; and
   generate, for the batch, the loss from the output of the machine-learning model using the additional batchwise weight for the additional class, wherein the additional batchwise weight for the additional class is different than the batchwise weight for the class.

7. The non-transitory computer readable storage medium as recited in claim 1, wherein the instructions that cause the computer system to determine the source density cause the computer system to:
   concatenate the text documents from the digital content source into a concatenated text document;
   compare words in the concatenated text document to the word corpus to determine a set of distinguishing words for the digital content source; and
   determine the source density for the digital content source by comparing the set of distinguishing words with words in the concatenated text document.

8. The non-transitory computer readable storage medium as recited in claim 1, wherein the instructions that cause the computer system to train the machine-learning model cause the computer system to:
   generate a plurality of word embeddings from padded segments corresponding to an identified document of the text documents from the digital content source;
   determine a document embedding for the identified document by combining the plurality of word embeddings for the identified document; and
   train the machine-learning model using the document embedding as an input to the machine-learning model.

9. The non-transitory computer readable storage medium as recited in claim 1, wherein the length of each segment of the plurality of segments from the text document is inversely proportional to the source density.

10. The non-transitory computer readable storage medium as recited in claim 1, wherein a padded segment of the plurality of padded segments comprises a first portion based on one or more words from the text document and a second portion comprising the set of padding characters.

11. A system comprising:
one or more memory devices storing text documents from a first digital content source, text documents from a second digital content source, a word corpus, and a machine-learning model; and
one or more servers that cause the system to:
determine a first source density for the first digital content source by determining a first ratio of distinguishing words in the text documents from the first digital content source relative to the word corpus;
determine a second source density for the second digital content source by determining a second ratio of distinguishing words in the text documents from the second digital content source relative to the word corpus;
generate a first padded segment from a first text document from the first digital content source by appending padding characters to a segment from the first text document, wherein the first padded segment comprises a first padded portion having a first length determined based on the first source density;
generate a second padded segment from a second text document from the second digital content source by appending padding characters to a segment from the second text document, wherein the second padded segment comprises a second padded portion having a second length determined based on the second source density; and
train the machine-learning model to classify documents based on the first padded segment and the second padded segment.

12. The system as recited in claim 11, wherein the one or more servers further cause the system to generate a plurality of padded segments from the first text document from the first digital content source, the plurality of padded segments comprising padded portions having the first length determined based on the first source density.

13. The system as recited in claim 11, wherein the one or more servers cause the system to train the machine-learning model by:
determining, for a batch of training documents comprising at least one of the first text document or the second text document, a batchwise weight for a class of a plurality of classes based on a proportion of positive samples in the class within the batch; and
generating, for the batch, a loss from an output of the machine-learning model using the batchwise weight for the class.

14. The system as recited in claim 13, wherein the one or more servers cause the system to train the machine-learning model by:
determining, for an additional batch of training documents, an additional batchwise weight for the class of the plurality of classes based on a proportion of positive samples in the class within the additional batch;
generating, for the additional batch, a loss from an additional output of the machine-learning model using the additional batchwise weight for the class; and
modifying parameters of the machine-learning model based on the loss from the output of the machine-learning model and the loss from the additional output of the machine-learning model.

15. The system as recited in claim 11, wherein the one or more servers cause the system to train the machine-learning model by:
generating a first word embedding from the first padded segment and a second word embedding from the second padded segment;
generating a first document embedding for the first text document based on the first word embedding and a second document embedding for the second text document based on the second word embedding; and
training the machine-learning model using the first document embedding and the second document embedding as inputs to the machine-learning model.

16. The system as recited in claim 15, wherein the one or more servers cause the system to generate the first document embedding and the second document embedding by:
generating the first document embedding by combining a first plurality of word embeddings for the first text document, the first plurality of word embeddings comprising the first word embedding; and
generating the second document embedding by combining a second plurality of word embeddings for the second text document, the second plurality of word embeddings comprising the second word embedding.

17. A computer-implemented method comprising:
determining, for a digital content source of a plurality of digital content sources, a source density based on comparing words in text documents from the digital content source to a word corpus;
dividing a text document from the digital content source into a plurality of segments, wherein each segment of the plurality of segments has a length determined based on the source density;
generating, from the plurality of segments, padded segments by adding a set of padding characters to each segment of the plurality of segments for the text document from the digital content source, wherein each padded segment of the padded segments has a padded segment length; and
training a machine-learning model to classify documents based on the padded segments.

18. The computer-implemented method as recited in claim 17, wherein training the machine-learning model comprises:
predicting classes for the padded segments;
comparing the predicted classes to ground-truth classes for the text documents from the plurality of digital content sources; and
modifying parameters of the machine-learning model based on comparing the predicted classes to the ground-truth classes.

19. The computer-implemented method as recited in claim 17, wherein a padded segment of the padded segments from the text documents comprises a word portion and a padded portion, the padded portion comprising a set of padding characters.

20. The computer-implemented method as recited in claim 19, wherein a length of the padded portion comprises a length determined based on a source density for a corresponding digital content source of the plurality of digital content sources, the source density reflecting a number of classification-specific words in text documents from the corresponding digital content source.

* * * * *